United States Patent
Nammoto et al.

(10) Patent No.: US 10,329,042 B2
(45) Date of Patent: Jun. 25, 2019

(54) PACKING APPARATUS AND PACKING METHOD

(71) Applicant: Seiko Epson Corporation, Tokyo (JP)

(72) Inventors: Takashi Nammoto, Azumino (JP); Kazuhiro Kosuge, Sendai (JP); Tomoki Harada, Matsumoto (JP); Koichi Hashimoto, Sendai (JP); Kengo Yamaguchi, Sendai (JP)

(73) Assignee: Seiko Epson Corporation (JP)

( * ) Notice: Subject to any disclaimer, the term of this patent is extended or adjusted under 35 U.S.C. 154(b) by 419 days.

(21) Appl. No.: 15/069,055

(22) Filed: Mar. 14, 2016

(65) Prior Publication Data

US 2016/0272354 A1    Sep. 22, 2016

(30) Foreign Application Priority Data

Mar. 20, 2015   (JP) ................................. 2015-058339
Mar. 23, 2015   (JP) ................................. 2015-059564

(51) Int. Cl.
| | | |
|---|---|---|
| *B25J 9/00* | (2006.01) | |
| *B65B 5/06* | (2006.01) | |
| *B25J 13/08* | (2006.01) | |
| *B25J 19/02* | (2006.01) | |
| *B65B 35/16* | (2006.01) | |
| *B65B 35/32* | (2006.01) | |
| *B65B 57/06* | (2006.01) | |

(52) U.S. Cl.
CPC ............. *B65B 57/06* (2013.01); *B25J 9/0087* (2013.01); *B25J 13/085* (2013.01); *B25J 19/023* (2013.01); *B65B 5/06* (2013.01); *B65B 35/16* (2013.01); *B65B 35/32* (2013.01)

(58) Field of Classification Search
CPC ......... B65B 43/46; B65B 35/16; B65B 35/36; B65B 35/38; B65B 57/02–57/14; B65B 5/105; B65B 5/106; B65B 5/108; B65B 25/141; B65B 25/143; B65B 65/003; B65B 65/006; B65B 67/00; B65B 67/02; B65B 43/48; B65B 43/56; B25J 9/1633; B25J 9/0087; B25J 9/043; B25J 13/085; G06Q 10/08–10/0875
USPC .................. 53/249–251, 390; 901/9, 10, 34; 414/287
See application file for complete search history.

(56) References Cited

U.S. PATENT DOCUMENTS

| | | | | |
|---|---|---|---|---|
| 3,161,004 A | * | 12/1964 | Muzinich ................ B65B 67/02 | |
| | | | | 198/560 |
| 3,586,176 A | * | 6/1971 | Rackman ................ B25J 9/026 | |
| | | | | 414/792 |

(Continued)

FOREIGN PATENT DOCUMENTS

| | | |
|---|---|---|
| JP | 2000-043806 A | 2/2000 |
| JP | 2003-160115 A | 6/2003 |

(Continued)

*Primary Examiner* — Stephen F. Gerrity
*Assistant Examiner* — Joshua G Kotis
(74) *Attorney, Agent, or Firm* — Harness, Dickey & Pierce, P.L.C.

(57) ABSTRACT

For accurate housing of an object to be packed even in an unfixed box body, a packing apparatus includes a movable unit and a force detection part provided in the movable unit and houses an object to be packed in a box body formed from a packing material based on an output value of the force detection part.

2 Claims, 19 Drawing Sheets

(56) References Cited

U.S. PATENT DOCUMENTS

| | | | |
|---|---|---|---|
| 6,260,689 B1 | 7/2001 | Takemoto et al. | |
| 6,382,401 B2 | 5/2002 | Takemoto et al. | |
| 6,429,617 B1* | 8/2002 | Sano | B25J 9/1666 318/560 |
| 7,266,422 B1* | 9/2007 | DeMotte | B25J 9/1687 414/791.6 |
| 7,313,464 B1* | 12/2007 | Perreault | B25J 9/1666 318/568.1 |
| 7,644,558 B1* | 1/2010 | Fallas | B25J 9/0093 53/251 |
| 8,935,004 B2 | 1/2015 | Iida | |
| 2001/0050209 A1 | 12/2001 | Takemoto et al. | |
| 2009/0069942 A1* | 3/2009 | Takahashi | B25J 9/1633 700/260 |
| 2010/0305754 A1* | 12/2010 | Ban | B25J 9/0093 700/248 |
| 2011/0211938 A1* | 9/2011 | Eakins | B25J 9/1687 414/738 |
| 2012/0010747 A1* | 1/2012 | Okazaki | G05B 19/423 700/253 |
| 2012/0048027 A1* | 3/2012 | Hashiguchi | B25J 9/0087 73/763 |
| 2012/0083920 A1 | 4/2012 | Suyama et al. | |
| 2012/0253516 A1 | 10/2012 | Iida | |
| 2012/0290133 A1* | 11/2012 | Goto | B25J 9/1612 700/258 |
| 2013/0019993 A1 | 1/2013 | Roura Adell et al. | |
| 2013/0125517 A1 | 5/2013 | Gomi | |
| 2013/0312371 A1* | 11/2013 | Ambrose | G06Q 10/087 53/473 |
| 2013/0320609 A1* | 12/2013 | Keane | B65H 29/14 271/10.01 |
| 2014/0075891 A1* | 3/2014 | Hooper | B65B 5/108 53/448 |
| 2014/0103676 A1 | 4/2014 | Nammoto et al. | |
| 2014/0180479 A1* | 6/2014 | Argue | B25J 9/0093 700/259 |
| 2014/0316572 A1* | 10/2014 | Iwatake | B25J 9/1633 700/258 |
| 2014/0365003 A1* | 12/2014 | Takahashi | B25J 5/007 700/245 |
| 2014/0365009 A1* | 12/2014 | Wettels | B25J 9/1612 700/258 |
| 2015/0005926 A1* | 1/2015 | Pettersson | B65B 59/00 700/228 |
| 2015/0013277 A1* | 1/2015 | Brandhorst | B65B 35/18 53/475 |
| 2015/0105907 A1* | 4/2015 | Aiso | B25J 9/1697 700/259 |
| 2015/0251315 A1* | 9/2015 | Brandenberger | B25J 9/1676 700/255 |
| 2015/0343641 A1* | 12/2015 | Maruyama | B25J 9/1697 700/259 |
| 2016/0052135 A1* | 2/2016 | Motoyoshi | B25J 9/1687 29/281.6 |
| 2016/0059972 A1 | 3/2016 | Nagata et al. | |
| 2016/0221193 A1* | 8/2016 | Sato | B25J 9/1694 |

FOREIGN PATENT DOCUMENTS

| | | |
|---|---|---|
| JP | 2004-189293 A | 7/2004 |
| JP | 2005-047571 A | 2/2005 |
| JP | 2011-000669 A | 1/2011 |
| JP | 2011-084332 A | 4/2011 |
| JP | 2012-076805 A | 4/2012 |
| JP | 2012-206206 A | 10/2012 |
| JP | 2012-223829 A | 11/2012 |
| JP | 2013-023287 A | 2/2013 |
| JP | 2013-100118 A | 5/2013 |
| JP | 2014-076522 A | 5/2014 |
| JP | 2014-218268 A | 11/2014 |
| JP | 2015-054384 A | 3/2015 |
| WO | WO-2014-125627 A1 | 8/2014 |
| WO | WO-2014125627 A1 * | 8/2014 ............ B65B 35/36 |

* cited by examiner

PACKING APPARATUS AND PACKING METHOD

BACKGROUND

1. Technical Field

The present invention relates to a packing apparatus and a packing method.

2. Related Art

Research and development of a technology for a packing apparatus to accurately house an object to be packed in a box body for housing the object to be packed have been carried out.

In this regard, a packing apparatus that houses an object to be packed in a box body by fixing the box body so that the box body may not move from a mounting surface on which the box body is mounted, and moving the object to be packed while grasping at least one of opposing corners of the object to be packed is known (see International Publication No. 2014/125627).

Further, research and development of a robot supplied with predetermined portions (e.g. screws or the like) from a supply apparatus such as a parts feeder or a human hand and performing predetermined work (e.g. fastening of screws) using the supplied parts have been carried out. The supply of parts to the robot is performed by the supply apparatus or the human hand because the parts are often packed in bags before shipment and it is necessary to open the bags and take the parts out of the bags.

In this regard, an unpacking apparatus that takes out objects packed in a packing material such as a bag from the packing material is known (JP-A-2013-100118).

However, in the packing apparatus disclosed in International Publication No. 2014/125627, when the box body is not fixed to the mounting surface, the box body may move with the object to be packed. As a result, it is difficult to accurately house the object to be packed in the box body.

Further, in the unpacking apparatus disclosed in JP-A-2013-100118, the housing status of the object packed inside of the packing material is not confirmed. Accordingly, when the packing material is unpacked, an unintended event e.g. an event that the object drops from the inside to the outside of the packing material when the packing material is unpacked or the like may occur.

SUMMARY

An aspect of the invention is directed to a packing apparatus including a movable unit, and a force detection part provided in the movable unit, wherein objects to be packed are housed in a box body formed from a packing material based on an output value of the force detection part.

According to the configuration, the packing apparatus houses the objects to be packed in the box body formed from the packing material based on the output value of the force detection part provided in the movable unit. Thereby, the packing apparatus may house the objects to be packed in the box body under force control and, as a result, may accurately house the objects to be packed even in a box body not fixed to a mounting surface.

In another aspect of the invention, in the packing apparatus, the box body may be moved by application of a force to a first portion of the box body by a first portion of the movable unit, a second portion of the movable unit may be brought into contact with a second portion of the box body, positioning of the box body may be performed based on the output value of the force detection part, and the objects to be packed may be housed in the box body.

According to the configuration, the packing apparatus moves the box body by applying the force by the first portion of the movable unit to the first portion of the box body, brings the second portion of the movable unit into contact with the second portion of the box body, and performs positioning of the box body based on the output value of the force detection part, and houses the objects to be packed in the box body. Thereby, the packing apparatus may accurately house the objects to be packed in the box body based on the positioning of the box body.

In another aspect of the invention, in the packing apparatus, a first object to be packed of the objects to be packed may be placed in the box body by one or both of the first portion of the movable unit and the second portion of the movable unit based on the positioning of the box body.

According to the configuration, the packing apparatus places the first object to be packed of the objects to be packed in the box body by one or both of the first portion of the movable unit and the second portion of the movable unit based on the positioning of the box body. Thereby, the packing apparatus may suppress placement of the first object to be packed in an unintended location outside of the box body or the like.

In another aspect of the invention, in the packing apparatus, the first portion of the movable unit may apply a force to the first portion of the box body via a second object to be packed of the objects to be packed.

According to the configuration, in the packing apparatus, the first portion of the movable unit applies the force to the first portion of the box body via the second object to be packed of the objects to be packed. Thereby, the packing apparatus may apply the force to the first portion of the box body while moving the second object to be packed within the box body.

In another aspect of the invention, in the packing apparatus, the second object to be packed may be housed in a predetermined housing position by the positioning.

According to the configuration, the packing apparatus houses the second object to be packed in the predetermined housing position by the positioning of the box body. Thereby, the packing apparatus may suppress a difference in position of the box body produced when the positioning of the box body and the housing of the second object to be packed are performed by separate operations.

In another aspect of the invention, in the packing apparatus, the second object to be packed may be placed in a predetermined placement position of the box body, the second object to be packed may be moved by the first portion of the movable unit into contact with the first portion of the box body, and thereby, the force may be applied to the first portion of the box body.

According to the configuration, the packing apparatus places the second object to be packed in the predetermined placement position of the box body, moves the second object to be packed by the first portion of the movable unit into contact with the first portion of the box body, and thereby, applies the force to the first portion of the box body. Thereby, the packing apparatus may perform positioning of the box body after placing the second object to be packed inside of the box body even when the position of the box body differs.

In another aspect of the invention, in the packing apparatus, the predetermined placement position may be substantially at a center of a bottom surface of the box body.

According to the configuration, the packing apparatus places the second object to be packed substantially at the center of the bottom surface of the box body, moves the second object to be packed by the first portion of the movable unit into contact with the first portion of the box body, and thereby, applies the force to the first portion of the box body. Thereby, the packing apparatus may perform positioning of the box body after placing the second object to be packed inside of the box body more reliably even when the position of the box body differs.

In another aspect of the invention, in the packing apparatus, the box body may be formed from the packing material in a folded state.

According to the configuration, the packing apparatus houses the objects to be packed in the box body formed from the packing material in the folded state based on the output value of the force detection part provided in the movable unit. Thereby, the packing apparatus may house the objects to be packed in the box body formed from the packing material in the folded state under force control.

Another aspect of the invention is directed to a packing method including housing an object to be packed in a box body formed from a packing material in a folded state based on an output value of a force detection part provided in a movable unit.

According to the configuration, the packing method houses the object to be packed in the box body formed from the packing material in the folded state based on the output value of the force detection part provided in the movable unit. Thereby, the packing method may house the object to be packed in the box body under force control and, as a result, may accurately house the object to be packed even in a box body not fixed to a mounting surface.

As described above, the packing apparatus and the packing method house the object to be packed in the box body formed from the packing material in the folded state based on the output value of the force detection part provided in the movable unit. Thereby, the packing apparatus and the packing method may house the object to be packed in the box body under force control and, as a result, may accurately house the object to be packed even in a box body not fixed to amounting surface.

Another aspect of the invention is directed to a robot that grasps a packing material based on a housing status of an object packed in the packing material.

According to the configuration, the robot grasps the packing material based on the housing status of the object packed in the packing material. Thereby, the robot may grasp a position in response to the housing status of the object packed in the packing material and perform work.

In another aspect of the invention, in the robot, after the packing material is grasped, the packing material may be cut.

According to the configuration, the robot grasps the packing material, and then, cuts the packing material. Thereby, the robot may take the object from the inside of the packing material to the outside of the packing material.

In another aspect of the invention, in the robot, when the packing material is cut, a position in which the packing material is tensed may be cut.

According to the configuration, the robot cuts the position in which the packing material is tensed when cutting the packing material. Thereby, the robot may suppress a failure of cutting of the packing material due to an event caused by an insufficient tensile force applied to the packing material.

In another aspect of the invention, in the robot, after the packing material is cut, the object may be taken out of the packing material and the packing material may be mounted on a predetermined location.

According to the configuration, the robot takes the object out of the packing material and mounts the packing material on the predetermined location after cutting of the packing material. Thereby, the robot may repeatedly unpack the packing material and supply the object without interference with the unpacked packing material.

In another aspect of the invention, in the robot, the packing material may be grasped, the packing material may be moved, and thereby, a position relationship between the object and the packing material may be changed.

According to the configuration, the robot grasps the packing material, moves the packing material, and changes the position relationship between the object and the packing material. Thereby, the robot may grasp the position in response to the housing status adjusted by moving the packing material and perform work.

In another aspect of the invention, in the robot, if the detection of the housing status is impossible, the packing material may be moved, and thereby, the position relationship between the object and the packing material may be changed.

According to the configuration, if the detection of the housing status is impossible, the robot changes the position relationship between the object and the packing material by moving the packing material. Thereby, even when the housing status of the object packed in the packing material is unknown, the robot may grasp the position in response to the housing status adjusted by moving the packing material and perform work.

In another aspect of the invention, in the robot, a first grasping portion of the packing material may be grasped by a first grasping part and a second grasping portion of the packing material may be grasped by a second grasping part based on the housing status.

According to the configuration, the robot grasps the first grasping portion of the packing material by the first grasping part and grasps the second grasping portion of the packing material by the second grasping part based on the housing status of the object packed in the packing material. Thereby, the robot may grasp the first grasping portion in response to the housing status of the object packed in the packing material by the first grasping part and grasp the second grasping portion in response to the housing status by the second grasping part and perform work.

In another aspect of the invention, in the robot, the housing status may be determined based on positions of at least two or more of the objects inside of the packing material.

According to the configuration, the robot may determine the housing status of the objects packed in the packing material based on positions of at least two or more objects inside of the packing material. Thereby, the robot may grasp the position in response to the housing status determined based on the positions of the two or more objects and perform work.

In another aspect of the invention, in the robot, an imaging part may be provided, and positions of at least two or more objects inside of the packing material may be detected based on a captured image captured by the imaging part.

According to the configuration, the robot detects the positions of at least two or more objects inside of the packing material based on the captured image captured by the imaging part. Thereby, the robot may grasp the position in response to the housing status determined based on the positions of the two or more objects detected based on the captured image and perform work.

In another aspect of the invention, in the robot, a contact part may be provided, and the contact part may be moved to trace a surface of the packing material and the housing status may be determined based on changes in height of the surface of the packing material.

According to the configuration, the robot moves the contact part to trace the surface of the packing material and determines the housing status based on the changes in height of the surface of the packing material. Thereby, the robot may grasp the position in response to the housing status determined based on the changes in height of the surface of the packing material and perform work.

In another aspect of the invention, in the robot, a first grasping part may be provided and, if the packing material is grasped by the first grasping part and cutting of the packing material fails, a grasping position of the packing material by the first grasping part may be changed.

According to the configuration, if the robot grasps the packing material by the first grasping part and fails to cut the packing material, the robot changes the grasping position of the packing material by the first grasping part. Thereby, the robot may continue work without interruption even when the first grasping part grasps the position not suitable for cutting of the packing material and the cutting of the packing material fails.

In another aspect of the invention, in the robot, a second grasping part may be provided and, if the packing material is grasped by the second grasping part and cutting of the packing material fails, a grasping position of the packing material by the second grasping part may be changed.

According to the configuration, if the robot grasps the packing material by the second grasping part and fails to cut the packing material, the robot changes the grasping position of the packing material by the second grasping part. Thereby, the robot may continue work without interruption even when one or both of the first grasping part and the second grasping part grasp the position not suitable for cutting of the packing material and the cutting of the packing material fails.

In another aspect of the invention, in the robot, a force sensor may be provided and the packing material may be grasped based on an output value of the force sensor.

According to the configuration, the robot grasps the packing material based on the output value of the force sensor. Thereby, the robot may suppress unintended unpacking of the packing material by applying an excessive force to the packing material when grasping the packing material.

Another aspect of the invention is directed to a control apparatus that allows a robot to grasp a packing material based on a housing status of an object packed in the packing material.

According to the configuration, the control apparatus allows the robot to grasp the packing material based on the housing status of the object packed in the packing material. Thereby, the control apparatus may grasp the position in response to the housing status of the object housed in the packing material and perform work.

Another aspect of the invention is directed to a control method that allows a robot to grasp a packing material based on a housing status of an object packed in the packing material.

According to the configuration, the control method allows the robot to grasp the packing material based on the housing status of the object packed in the packing material. Thereby, the control method may grasp the position in response to the housing status of the object packed in the packing material and perform work.

As described above, the robot, the control apparatus, and the control method grasp the packing material based on the housing status of the object packed in the packing material. Thereby, the robot, the control apparatus, and the control method may grasp the position in response to the housing status of the object packed in the packing material and perform work.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, embodiments of the invention will be explained with reference to the drawings.

Figure 1:
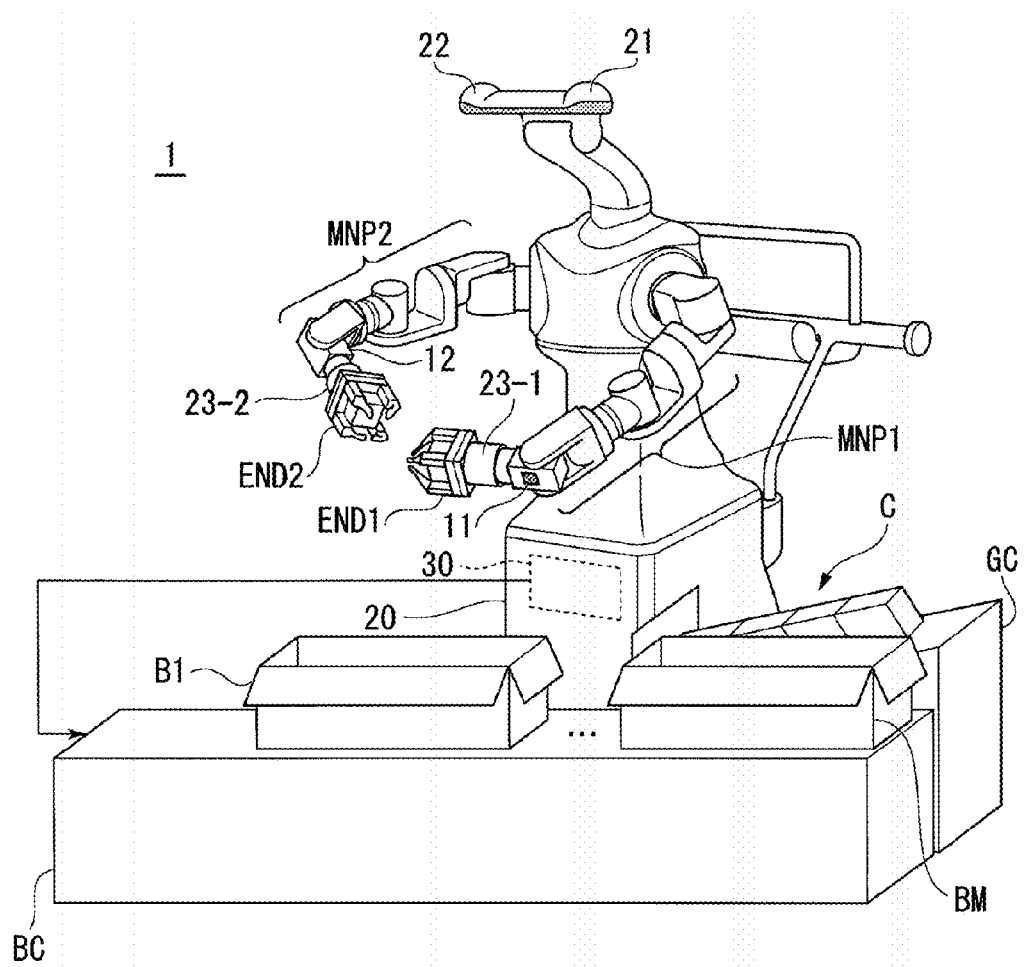
FIG. 1 is a configuration diagram showing an example of a packing system according to the first embodiment.

FIG. 1 is a configuration diagram showing an example of a packing system 1 according to the embodiment. The packing system 1 includes a packing apparatus 20, a gravity conveyer GC, and a belt conveyer BC. Further, the packing apparatus 20 has a built-in control apparatus 30.

In FIG. 1, N objects to be packed C at the maximum can be mounted on the gravity conveyer GC. N is an integer equal to or more than one. Further, in the example, if the number of the objects to be packed C is less than a predetermined number, the objects to be packed C are supplied by a user or another robot to the gravity conveyer GC. Note that the predetermined number may be any integer equal to or more than one. The gravity conveyer GC supplies (carries) one or more objects to be packed C mounted on the gravity conveyer GC one by one to a predetermined first supply position by gravity.

The supply to the first supply position refers to moving of the object to be packed C so that a position of a predetermined portion of the object to be packed C may coincide with the first supply position. The predetermined portion of the object to be packed C is e.g. the center of a bottom surface of the object to be packed C, or may be another portion of the object to be packed C. The bottom surface of the object to be packed C refers to a surface in contact with the mounting surface when the object to be packed C is mounted. Note that the first supply position may be any position as long as the object to be packed C can be held by the packing apparatus 20 when the position of the predetermined portion of the object to be packed C coincides with the first supply position.

The object to be packed C is e.g. an object of a processed product industrially processed, a part, or the like, or may be another object. In the example, the object to be packed C is shown by an object having a cubic shape or may have another shape. Note that, in the example, the case where the respective one or more objects to be packed C have the same shape and size with one another is explained, however, the objects may have different shapes and sizes from one another instead. Further, in the example, in place of the configuration in which the objects to be packed C are supplied to the first supply position by the gravity conveyer GC one by one, the objects may be supplied by a belt conveyer or supplied by another method, or loaded in bulk.

In FIG. 1, M box bodies B1 to BM are mounted on the belt of the belt conveyer BC. M is an integer equal to or more than one. As below, for convenience of explanation, the box bodies B1 to BM will be collectively referred to as "box bodies B" unless distinction is necessary. Further, as below, the belt of the belt conveyer BC will be simply referred to as "belt". For example, each of the M box bodies B is mounted with respect to each of a plurality of predetermined mounting positions set on the belt. The mounting of the box body B in the predetermined mounting position set on the belt refers to mounting such that a position of a predetermined portion of the box body B may coincide with the mounting position.

However, each box body B is not fixed to the mounting position on the belt. That is, each box body B is not immovably fixed to each of the plurality of predetermined mounting positions on the belt (mounting surface), but simply mounted thereon. The position of the predetermined portion of the box body B may differ from the predetermined mounting position. In the example, as below, the case where the position of the predetermined portion of the box body B differs from the predetermined mounting position will be explained.

Note that the predetermined portion of the box body B is e.g. the center of the bottom surface of the box body B, or may be another portion of the box body B. In the example, the case where the difference between the position of the predetermined portion of the box body B and the predetermined mounting position at the maximum is a difference to the extent at which the object to be packed C is inside of the box body B when the object to be packed C is placed so that the position of the predetermined portion of the object to be packed C may coincide with the predetermined mounting position set on the belt will be explained.

The belt conveyer BC is communicably connected to the control apparatus 30 by a cable. Wired communication via the cable is performed by e.g. a standard of Ethernet (registered trademark) or USB (Universal Serial Bus). Note that the belt conveyer BC and the control apparatus 30 may be adapted to be connected via wireless communication performed by a communication standard of Wi-Fi (registered trademark) or the like. The belt conveyer BC supplies (carries) the box bodies B mounted on the belt conveyer BC based on control signals from the control apparatus 30 one by one to a predetermined second supply position by driving the belt.

The supply of the box body B to the second supply position refers to moving of the box body B mounted on the predetermined mounting position with the mounting position (i.e., with the belt) by driving the belt so that the mounting position set on the belt may coincide with the second supply position.

However, as described above, the box body B is not fixed in the mounting position on the belt. Accordingly, when the box body B is supplied to the second supply position by the belt conveyer BC, there may be cases where the position of the predetermined portion of the box body B does not coincide with, but differs from the second supply position because the box body B is shifted from the predetermined mounting position on the belt. Note that the second supply position may be any position as long as the object to be packed C can be housed in the box body B by the packing apparatus 20 when the box body B is supplied to the second supply position.

The box body B is e.g. a cardboard box formed from a folded cardboard (an example of the packing material), however, may be another container that can pack the object to be packed C. Further, the box body B is a cardboard box having a shape and a size that can pack Q objects to be packed C. Q is an integer equal to or more than one. As below, as an example, the case where Q is four will be explained. In the example, in place of the configuration in which the box bodies B are supplied to the second supply position by the belt conveyer BC one by one, the box bodies may be supplied by a gravity conveyer or supplied by another method, or loaded in bulk.

The packing system 1 packs the objects to be packed C in the box bodies B by the packing apparatus 20. Further, the packing system 1 packs the Q objects to be packed C in one box body B by the packing apparatus 20. Q is an integer equal to or more than one. The packing system 1 allows the packing apparatus 20 to hold the objects to be packed C supplied to the first supply position. In the example, holding the objects to be packed C by the packing apparatus 20 refers to putting the objects to be packed C into a movable state by lifting the objects by one or more arms of the packing apparatus 20.

The packing system 1 packs the objects to be packed C held by the packing apparatus 20 in the box bodies B supplied to the second supply position. In the example, packing the objects to be packed C in the box bodies B refers to housing (placing) the objects to be packed C in predetermined housing positions within the box bodies B. As below, packing the objects to be packed C in the box bodies B will be referred to as "housing the objects to be packed C in the box bodies B".

Here, in the box body B, Q predetermined housing positions are determined. In the example, the shapes of the objects to be packed C are rectangular parallelepiped shapes, and accordingly, the predetermined housing positions are determined such that i of the objects to be packed C are disposed in the longitudinal direction and j of the objects to be packed are disposed in the lateral direction within the box body B. As below, for convenience of explanation, the position of the object to be packed C in the ith column and jth row within the box body B will be referred to as "housing position (i,j)". Note that i, j are integers equal to or more than one. Further, I×J=Q. Here, I refers to the maximum value of i. J refers to the maximum value of j. As below, as an example, the case where Q=4 and I=2, J=2 will be explained.

That is, the packing system 1 houses the respective four objects to be packed C in the predetermined housing positions within the box body B. As below, for convenience of explanation, the box body B in the state in which the respective four objects to be packed C are housed in the predetermined housing positions within the box body B will be referred to as "packed box body B". The packing system 1 houses the four objects to be packed C in the box body B, and then, carries the packed box body B to a location where the next work process is performed by the belt conveyer BC and supplies the next box body B to the second supply position. Then, the packing system 1 houses the next four objects to be packed C in the box body B. Note that, in the example, the case where the packing system 1 packs the objects to be packed C one by one in the box body B is explained, however, the system may hold a group of two or more objects to be packed C and pack the objects to be packed C in the box body B with respect to each held group.

When packing the four objects to be packed C in the box body B, the packing apparatus 20 of the packing system 1 applies a force to a first portion of the box body B by a first end effector to move the box body B, brings a second end effector into contact with a second portion of the box body B, and positions the box body B. Here, the first end effector and the second end effector respectively include force sensors. Therefore, the packing apparatus 20 operates the first end effector and the second end effector under the control based on output values of the force sensors and positions the box body B. In the example, positioning of the box body B refers to detection (calculation, specification) of the position of the predetermined portion of the box body B in a robot coordinate system.

Thereby, the packing system 1 may accurately house the objects to be packed C even in the box body B not fixed to the mounting surface. In other words, the packing system 1 may accurately house the objects to be packed C in the box body B even when the position of the predetermined portion of the box body B differs from the predetermined mounting position set on the belt.

As below, a packing method of the objects to be packed C in the box bodies B by the packing system 1 will be explained in detail.

Here, the packing apparatus 20 of the packing system 1 is explained.

The packing apparatus 20 is a dual-arm robot including e.g. a first imaging part 11, a second imaging part 12, a third imaging part 21, a fourth imaging part 22, a first force sensor 23-1, a second force sensor 23-2, a first end effector END1, a second end effector END2, a first manipulator MNP1, a second manipulator MNP2, and a plurality of actuators (not shown), and has the built-in control apparatus 30.

The dual-arm robot refers to a robot having two arms and, in the embodiment, has two arms of an arm including the first end effector END1 and the first manipulator MNP1 (hereinafter, referred to as "first arm") and an arm including the second end effector END2 and the second manipulator MNP2 (hereinafter, referred to as "second arm"). The first end effector END1 is an example of a first end effector. The second end effector END2 is an example of a second end effector.

Note that the packing apparatus 20 may be a single-arm robot in place of the dual-arm robot. The single-arm robot refers to a robot having a single arm and e.g. a robot having one of the above described first arm and second arm.

The first arm is of a seven-axis vertical articulated type in which a support, the first manipulator MNP1, and the first end effector END1 perform operations with seven-axis degrees of freedom by cooperative operations by the actuators. Note that the first arm may operate with the six degrees of freedom (six axis) or less, or operate with eight degrees of freedom (eight axis) or more. The first arm is an example of a first arm part. Further, the first arm includes the first imaging part 11.

The first imaging part 11 is a camera including e.g. a CCD (Charge Coupled Device), a CMOS (Complementary Metal Oxide Semiconductor), or the like as an imaging device that converts focused light into electric signals.

The first imaging part 11 is communicably connected to the control apparatus 30 by a cable. Wired communication via the cable is performed by e.g. a standard of Ethernet (registered trademark), USB, or the like. Note that the first imaging part 11 and the control apparatus 30 may be adapted to be connected via wireless communication performed by a communication standard of Wi-Fi (registered trademark) or the like. The first imaging part 11 is provided in a part of the first manipulator MNP1 forming the first arm as shown in FIG. 1, and movable according to the movement of the first arm.

The second arm is of a seven-axis vertical articulated type in which a support, the second manipulator MNP2, and the second end effector END2 perform operations with seven-axis degrees of freedom by cooperative operations by the actuators. Note that the second arm may operate with the six degrees of freedom (six axis) or less, or operate with eight degrees of freedom (eight axis) or more. The second arm is an example of a second arm part. Further, the second arm includes the second imaging part 12.

The second imaging part 12 is a camera including e.g. a CCD, a CMOS, or the like as an imaging device that converts focused light into electric signals.

The second imaging part 12 is communicably connected to the control apparatus 30 by a cable. Wired communication via the cable is performed by e.g. a standard of Ethernet (registered trademark), USB, or the like. Note that the second imaging part 12 and the control apparatus 30 may be adapted to be connected via wireless communication performed by a communication standard of Wi-Fi (registered trademark) or the like. The second imaging part 12 is provided in a part of the second manipulator MNP2 forming the second arm as shown in FIG. 1, and movable according to the movement of the second arm.

Here, when the packing apparatus 20 is a dual-arm robot as in the example, a part or all of the first arm and a part or all of the second arm are examples of movable units. A part or all of the first arm refers to a part or all of the first end effector END1 and the first manipulator MNP1 forming the first arm. Further, a part or all of the second arm refers to a part or all of the second end effector END2 and the second manipulator MNP2 forming the second arm. Note that, when the packing apparatus is a single-arm robot, a part or all of the first arm or the second arm of the single-arm robot is an example of the movable unit.

The third imaging part 21 is a camera including e.g. a CCD, a CMOS, or the like as an imaging device that converts focused light into electric signals. The third imaging part 21 is communicably connected to the control apparatus 30 by a cable. Wired communication via the cable is performed by e.g. a standard of Ethernet (registered trademark), USB, or the like. Note that the third imaging part 21 and the control apparatus 30 may be adapted to be connected via wireless communication performed by a communication standard of Wi-Fi (registered trademark) or the like.

The fourth imaging part 22 is a camera including e.g. a CCD, a CMOS, or the like as an imaging device that converts focused light into electric signals. The fourth imaging part 22 is communicably connected to the control apparatus 30 by a cable. Wired communication via the cable is performed by e.g. a standard of Ethernet (registered trademark), USB, or the like. Note that the fourth imaging part 22 and the control apparatus 30 may be adapted to be connected via wireless communication performed by a communication standard of Wi-Fi (registered trademark) or the like.

Note that, in the embodiment, the packing apparatus 20 may have a configuration without part or all of the first imaging part 11, the second imaging part 12, the third imaging part 21, and the fourth imaging part 22. Further, when the packing apparatus 20 has part or all of the first imaging part 11, the second imaging part 12, the third imaging part 21, and the fourth imaging part 22, part or all of the first imaging part 11, the second imaging part 12, the third imaging part 21, and the fourth imaging part 22 may be provided separately from the packing apparatus 20.

The first force sensor 23-1 is provided between the first end effector END1 and the first manipulator MNP1. The first force sensor 23-1 detects a force and moment acting on the first end effector END1. The first force sensor 23-1 outputs information representing the detected force and moment (hereinafter, referred to as "force sensor information") to the control apparatus 30 by communication. Note that the first force sensor 23-1 may be another sensor that detects a force and moment acting on the first end effector END1 such as a torque sensor. The first force sensor 23-1 is an example of a force detection part.

The second force sensor 23-2 is provided between the second end effector END2 and the second manipulator MNP2. The second force sensor 23-2 detects a force and moment acting on the second end effector END2. The second force sensor 23-2 outputs information representing the detected force and moment (hereinafter, referred to as "force sensor information") to the control apparatus 30 by communication. Note that the second force sensor 23-2 may be another sensor that detects a force and moment acting on the second end effector END2 such as a torque sensor. The second force sensor 23-2 is an example of the force detection part.

The force sensor information detected by one or both of the first force sensor 23-1 and the second force sensor 23-2 is used for control of the packing apparatus 20 by the control apparatus 30 based on the force sensor information. The control based on the force sensor information refers to compliance control of e.g. impedance control or the like. Note that, as below, the first force sensor 23-1 and the second force sensor 23-2 will be collectively referred to as "force sensor 23" unless distinction is necessary. Further, values showing the magnitude of the force and the magnitude of the moment contained in the force sensor information are examples of output values of the force sensor.

The packing apparatus 20 is controlled by the built-in control apparatus 30. Note that the packing apparatus 20 may have a configuration controlled by the control apparatus 30 provided outside in place of the configuration with the built-in control apparatus 30.

Each of the first imaging part 11, the second imaging part 12, the third imaging part 21, the fourth imaging part 22, the first force sensor 23-1, the second force sensor 23-2, the first end effector END1, the second end effector END2, the first manipulator MNP1, the second manipulator MNP2, and the plurality of actuators (not shown) (hereinafter, referred to as "each functional part of the packing apparatus 20") of the packing apparatus 20 is communicably connected to e.g. the control apparatus 30 built in the packing apparatus 20 by a cable. Wired communication via the cable is performed by e.g. a standard of Ethernet (registered trademark), USB, or the like. Note that each functional part of the packing apparatus 20 and the control apparatus 30 may be adapted to be connected via wireless communication performed by a communication standard of Wi-Fi (registered trademark) or the like. In the embodiment, each functional part of the packing apparatus 20 acquires control signals from the control apparatus 30 built in the packing apparatus 20, and performs operations based on the acquired control signals.

The control apparatus 30 allows the packing apparatus 20 to operate by transmitting the control signals to the packing apparatus 20. The control apparatus 30 allows the packing apparatus 20 to operate to house the objects to be packed C in the box bodies B. Further, the control apparatus 30 allows the belt conveyer BC to operate by transmitting the control signals to the belt conveyer BC. The control apparatus 30 allows the belt conveyer BC to operate to supply the box bodies B to the second supply position. Note that the control apparatus 30 may have a configuration that does not allow the belt conveyer BC to operate in place of the configuration that allows the belt conveyer BC to operate. In this case, the belt conveyer BC may be allowed to operate by another control apparatus or allowed to operate by a user such as a worker.

Next, referring to FIG. 2, a hardware configuration of the control apparatus 30 will be explained.

Figure 2:
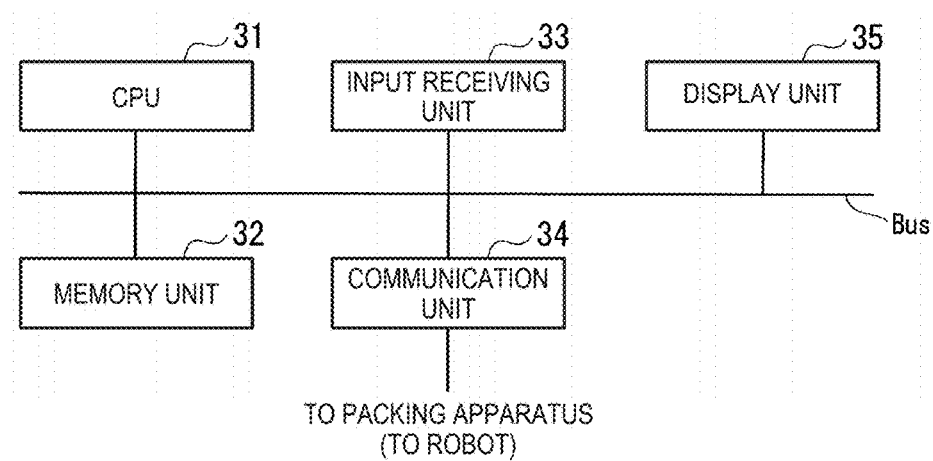
FIG. 2 shows an example of a hardware configuration of a control apparatus.

FIG. 2 shows an example of the hardware configuration of the control apparatus 30. The control apparatus 30 includes e.g. a CPU (Central Processing Unit) 31, a memory unit 32, an input receiving unit 33, a communication unit 34, and a display unit 35, and performs communication with the packing apparatus 20 via the communication unit 34. These component elements are communicably connected to one another via a bus Bus. The CPU 31 executes various programs stored in the memory unit 32.

The memory unit 32 includes e.g. an HDD (Hard Disk Drive), an SSD (Solid State Drive), an EEPROM (Electrically Erasable Programmable Read-Only Memory), a ROM (Read-Only Memory), a RAM (Random Access Memory), or the like, and stores various kinds of information, images, programs, etc. to be processed by the control apparatus 30. Note that the memory unit 32 may be an external memory device connected by a digital input/output port such as a USB in place of one built in the control apparatus 30.

The input receiving unit 33 is e.g. a teaching pendant including a keyboard, a mouse, and a touch pad or another input device. Note that the input receiving unit 33 may be integrally formed with the display unit as a touch panel.

The communication unit 34 includes e.g. a digital input/output port such as a USB, an Ethernet (registered trademark) port, or the like.

The display unit 35 is e.g. a liquid crystal display panel or an organic EL (ElectroLuminescence) display panel.

Next, referring to FIG. 3, a functional configuration of the control apparatus 30 will be explained.

Figure 3:
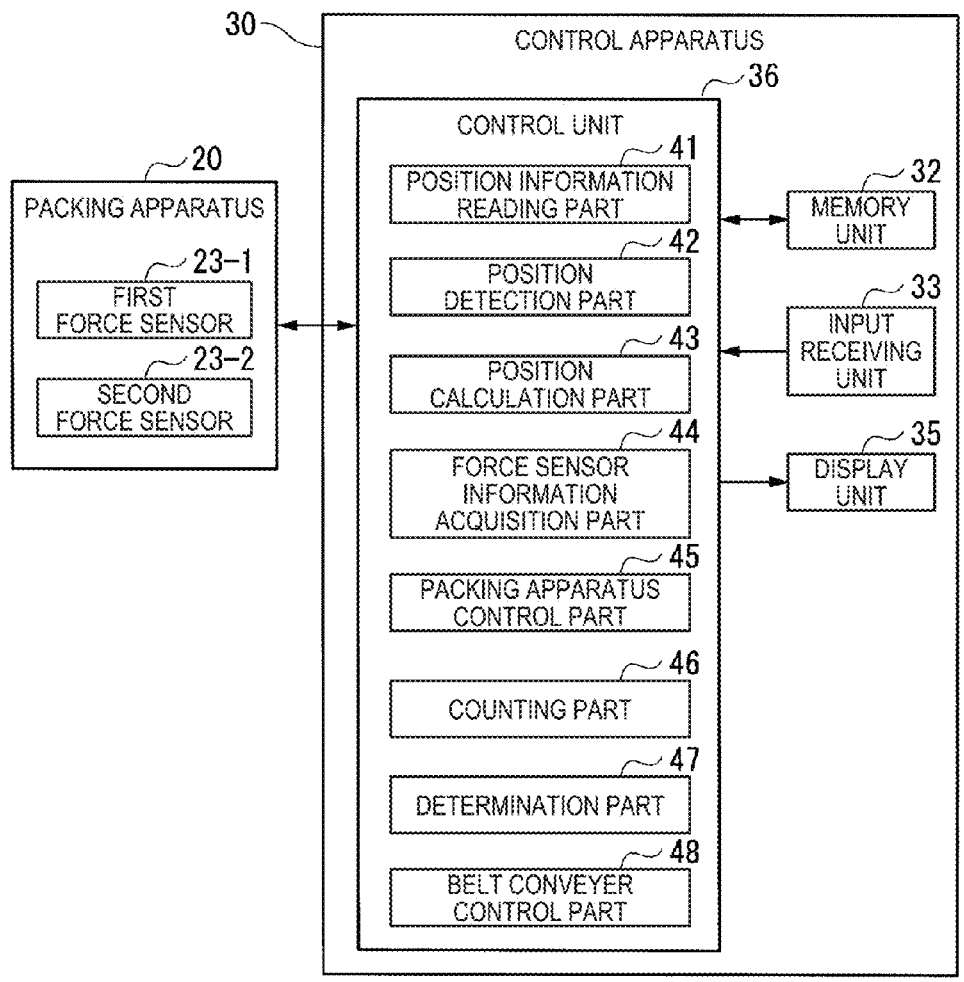
FIG. 3 shows an example of a functional configuration of the control apparatus.

FIG. 3 shows an example of the functional configuration of the control apparatus 30. The control apparatus 30 includes the memory unit 32, the input receiving unit 33, the display unit 35, and a control unit 36.

The control unit 36 controls the whole of the control apparatus 30. The control unit 36 includes a position information reading part 41, a position detection part 42, a position calculation part 43, a force sensor information acquisition part 44, a packing apparatus control part 45, a counting part 46, a determination part 47, and a belt conveyer control part 48. Part or all of the functional parts of the control unit 36 are realized by e.g. the CPU 31 executing various programs stored in the memory unit 32. Further, part or all of these functional parts may be hardware functional parts including LSI (Large Scale Integration) and ASIC (Application Specific Integrated Circuit).

The position information reading part 41 reads various kinds of position information stored in the memory unit 32 in advance. The various kinds of position information is information to be explained in a flowchart shown in FIG. 5, and includes e.g. the above described information representing the first supply position and information representing the second supply position, information representing the respective housing position (1,1) to housing position (I,J), etc.

The position detection part 42 detects positions of one or both of the first end effector END1 and the second end effector END2 in the robot coordinate system based on the force sensor information acquired from the force sensors 23. In the example, the position of the first end effector END1 in the robot coordinate system refers to a position of a TCP (Tool Center Point) of the first end effector END1 in the robot coordinate system. Further, the position of the second end effector END2 in the robot coordinate system refers to a position of a TCP of the second end effector END2 in the robot coordinate system.

Figure 5:
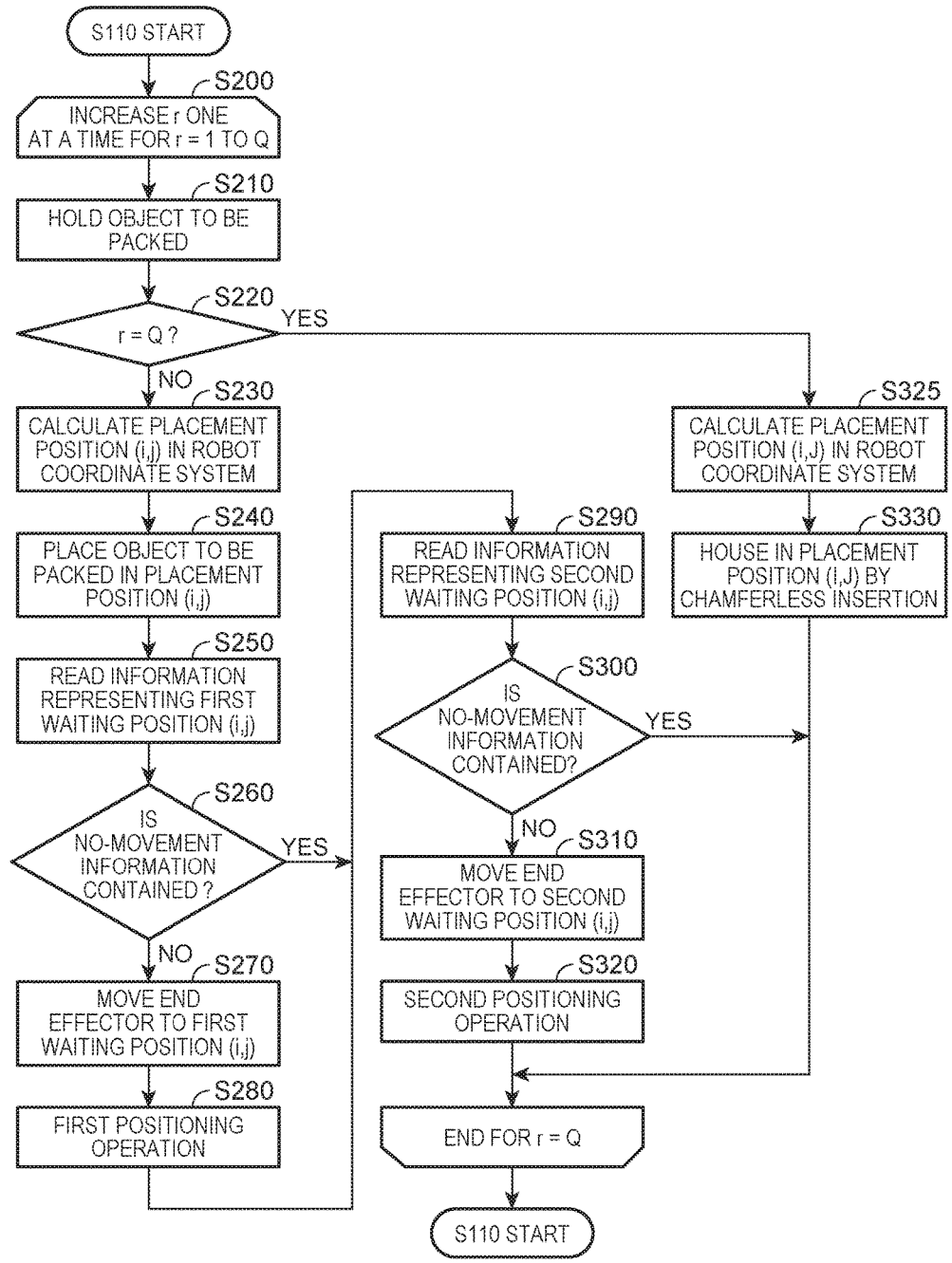
FIG. 5 is a flowchart showing an example of a flow of packing processing performed by the control unit at step S110 shown in FIG. 4.

The position calculation part 43 calculates various positions necessary for allowing the packing apparatus 20 to perform a positioning operation of positioning the box body B in the flowchart shown in FIG. 5.

The force sensor information acquisition part 44 acquires the force sensor information detected by the force sensors 23.

The packing apparatus control part 45 allows the packing apparatus 20 to operate based on information representing various positions calculated by the position calculation part 43. Further, the packing apparatus control part 45 allows the packing apparatus 20 to operate under the control based on the force sensor information acquired by the force sensor information acquisition part 44.

The counting part 46 counts the number of packed box bodies B formed by the packing apparatus 20.

The determination part 47 determines whether or not the number of packed box bodies B counted by the counting part 46 reaches a predetermined number. The predetermined number is e.g. ten or may be another number. Further, the determination part 47 performs various determinations to be explained in the flowchart shown in FIG. 5.

The belt conveyer control part 48 allows the belt conveyer BC to operate and supply the box bodies B to the second supply position. Further, the belt conveyer control part 48 allows the belt conveyer BC to operate and supply the packed box bodies B to the location where the next work process is performed.

Next, referring to FIG. 4, processing of allowing the packing apparatus 20 to form a predetermined number of packed box bodies B by the control unit 36 of the control apparatus 30 will be explained.

Figure 4:
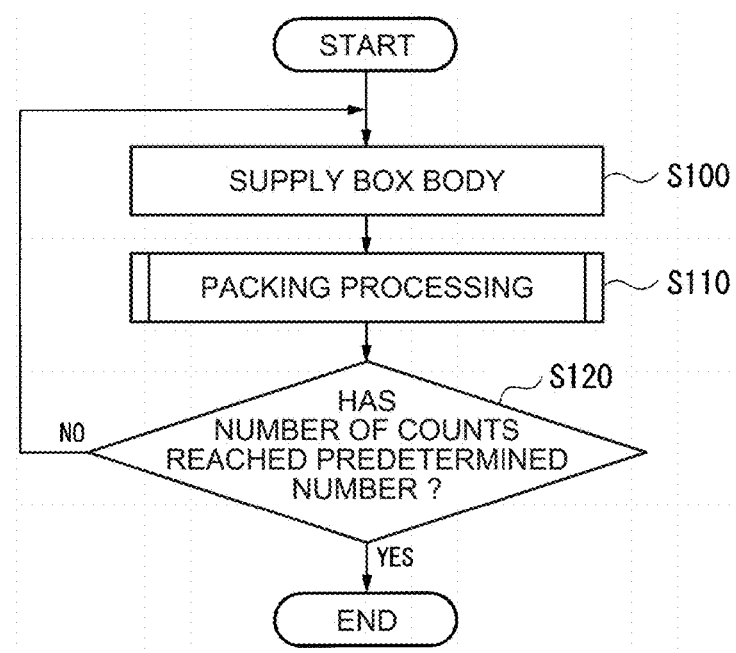
FIG. 4 is a flowchart showing an example of a flow of processing of allowing a packing apparatus to form a predetermined number of packed box bodies B by a control unit of the control apparatus.

FIG. 4 is a flowchart showing an example of a flow of processing of allowing the packing apparatus 20 to form the predetermined number of packed box bodies B by the control unit 36 of the control apparatus 30. Note that, as below, the explanation will be made with the number of counts of the packed box bodies B counted by the counting part 46 is initialized to zero before the processing at step S100 is performed.

First, the belt conveyer control part 48 drives the belt of the belt conveyer BC and supplies the box body B to the second supply position (step S100).

Then, the control unit 36 performs packing processing using the respective functional parts of the control unit 36, and houses the four objects to be packed C in the box body B supplied at step S100 (step S110). Then, the counting part 46 increases the number of counts of the packed box bodies B by one. Then, the determination part 47 determines whether or not the number of packed box bodies B counted by the counting part 46 has reached the predetermined number (step S120). If the determination part 47 determines that the number of counts of the packed box bodies B counted by the counting part 46 has not reached the predetermined number (step S120—No), the belt conveyer control part 48 transitions to step S100 and supplies the next box body B to the second supply position. On the other hand, if the determination part 47 determines that the number of counts of the packed box bodies B counted by the counting part 46 has reached the predetermined number (step S120—Yes), the control unit 36 ends the processing.

Next, referring to FIG. 5, the packing processing performed by the control unit 36 at step S110 shown in FIG. 4 will be explained.

FIG. 5 is a flowchart showing an example of a flow of the packing processing performed by the control unit 36 at step S110 shown in FIG. 4.

In the example, the operation of the packing apparatus 20 performed by the processing of the flowchart shown in FIG. 5 varies depending on the order of housing of the objects to be packed C to be housed in a certain box body B. More specifically, regarding the operations of the packing apparatus 20, of the objects to be packed C to be housed in a certain box body B, an operation of packing an object to be packed C being the first to be housed in the box body B, an operation of packing another object to be packed C than the objects being the first and the last to be housed in the box body B, and an operation of packing an object to be packed C being the last to be housed in the box body B are different.

Accordingly, as below, the operation of packing the object to be packed C being the first to be housed in the box body B, the operation of packing the other object to be packed C than the objects being the first and the last to be housed in the box body B, and the operation of packing the object to be packed C being the last to be housed in the box body B will be sequentially explained with reference to the flowchart shown in FIG. 5.

Note that, as below, for convenience of explanation, the box body B in which the packing apparatus 20 houses the objects to be packed C at step S110 shown in FIG. 4 will be referred to as "target box body". Further, as below, the order of housing of the objects to be packed C to be housed in the target box body is expressed by a variable r. That is, for the variable r=1, the packing apparatus 20 performs the operation of packing the object to be packed C being the first to be housed in the target box body of the objects to be packed C to be housed in the target box body. Furthermore, for r=2 to Q−1, the packing apparatus 20 performs the operation of packing the other object to be packed C than the objects being the first and the last to be housed in the target box body of the objects to be packed C to be housed in the target box body. For r=Q, the packing apparatus 20 performs the operation of packing the object to be packed C being the last to be housed in the target box body of the objects to be packed C to be housed in the target box body.

Operation Example 1: Regarding the Operation of Packing the Object to be Packed C being the First to be Housed in the Target Box Body As below, the case where the control unit 36 has read packing-related information stored in the memory unit 32 in advance will be explained. The packing-related information includes information representing shapes and sizes of the objects to be packed C and the box bodies B and information representing shapes and sizes of the first end effector END1 and the second end effector END2. Further, as below, the case where the control unit 36 has read information representing the second supply position stored in the memory unit 32 from the memory unit 32 in advance will be explained. Here, the second supply position is expressed in the robot coordinate system.

First, the control unit 36 generates the variable r. Further, the control unit 36 selects numbers from one to Q sequentially in ascending order one by one. The control unit 36 substitutes the selected values for the variable r. Then, the control unit 36 repeatedly performs processing from step S210 to step S330 with respect to each value substituted for the variable r (step S200). In the operation example 1, the control unit 36 substitutes one for the variable r.

Then, the position information reading part 41 reads information representing the first supply position stored in the memory unit 32 in advance from the memory unit 32. Here, the first supply position is expressed in the robot coordinate system. The packing apparatus control part 45 allows the packing apparatus 20 to hold the object to be packed C supplied to the first supply position by the gravity conveyer GC based on the read information representing the first supply position and the packing-related information (step S210). Further, the packing apparatus control part 45 allows the first end effector END1 and the second end effector END2 to hold the object to be packed C under the control based on the force sensor information acquired by the force sensor information acquisition part 44.

Note that, as below, for convenience of explanation, the first end effector END1 and the second end effector END2 will be collectively referred to as "both end effectors". Further, allowing both end effectors to hold the object to be packed C refers to e.g. putting the object to be packed C into a movable state by nipping and lifting up the object to be packed C with a hook portion of the first end effector END1 and a hook portion of the second end effector END2.

Then, the determination part 47 determines whether or not the value substituted for the variable r is Q (four in the example) (step S220).

If the determination part 47 determines that the value substituted for the variable r is Q (step S220—Yes), the packing apparatus control part 45 moves the processing to step S325.

On the other hand, if the determination part 47 determines that the value substituted for the variable r is not Q (step S220—No), the packing apparatus control part 45 moves the processing to step S230.

At step S220 in the operation example 1, the determination part 47 determines that the value substituted for the variable r is not Q because the variable r=1. Accordingly, at the step S220 in the operation example 1, only the case where the determination part 47 determines that the value substituted for the variable r is not Q is explained.

If the determination part 47 determines that the value substituted for the variable r is not Q, the position information reading part 41 reads row and column number correspondence information stored in the memory unit 32 in advance. The column and row number correspondence information is information in which column numbers i and row numbers j are associated with the values substituted for the variable r. In the example, the column numbers i and row numbers j associated with r are as follows.

r=1←(correspondence)→(i,j)=(1,1)
r=2←(correspondence)→(i,j)=(2,1)
r=3←(correspondence)→(i,j)=(1,2)
r=4←(correspondence)→(i,j)=(2,2)

The position information reading part 41 extracts the column number i and the row number j in response to the value substituted for the variable r of the moment from the read column and row number correspondence information. The position information reading part 41 reads information representing a placement position (i,j) stored in the memory unit 32 in advance from the memory unit 32 based on the extracted column number i and the row number j. The placement position (i,j) is a position where the object to be packed C is preliminarily placed as advance preparation before the object to be packed C is housed in the housing position (i,j) within the target box body. Further, the placement position (i,j) is expressed as e.g. a relative position from some position to the placement position (i,j). The position calculation part 43 calculates the placement position (i,j) in the robot coordinate system based on the information representing the placement position (i,j) read by the position information reading part 41 (step S230).

At step S230 in the operation example 1, the position information reading part 41 extracts a column number and a row number for (i,j)=(1,1) from the column and row number correspondence information. The position information reading part 41 reads information representing the placement position (1,1) from the memory unit 32 based on the extracted column number and row number for (i,j)=(1,1). The placement position (1,1) is expressed as a relative position from the second supply position to the placement position (1,1). That is, the position calculation part 43 calculates the placement position (1,1) in the robot coordinate system based on the read information representing the placement position (1,1) and the information representing the second supply position read from the memory unit 32 in advance.

Here, when the target box body is correctly mounted in the predetermined mounting position set on the belt, the second supply position is a position that coincides with the position of the predetermined portion of the target box body. In the example, the predetermined portion of the target box body, i.e., the predetermined portion of the box body B is the center of the bottom surface of the box body B. Accordingly, even when the position of the predetermined portion of the target box body differs from the second supply position, it is highly possible to place the object to be packed C inside of the target box body by placing the object to be packed C so that the position of the predetermined portion of the object to be packed C may coincide with the second supply position. For the reason, in the operation example 1, it is desirable that the placement position (1,1) coincides with the second supply position. Accordingly, as below, the case where the placement position (1,1) coincides with the second supply position will be explained.

Then, the packing apparatus control part 45 allows the packing apparatus 20 to place the object to be packed C in the placement position (i,j) based on the information representing the placement position (i,j) in the robot coordinate system calculated by the position calculation part 43 at step S230 (step S240). Placing the object to be packed C in the placement position (i,j) in the robot coordinate system refers to bringing the position of the predetermined portion of the object to be packed C to coincide with the placement position (i,j) in the robot coordinate system.

At step S240 in the operation example 1, the packing apparatus control part 45 allows the packing apparatus 20 to place the object to be packed C in the placement position (1,1) based on the information representing the placement position (1,1) in the robot coordinate system calculated by the position calculation part 43.

Here, referring to FIG. 6, the processing at step S240 in the operation example 1 will be explained.

Figure 6:
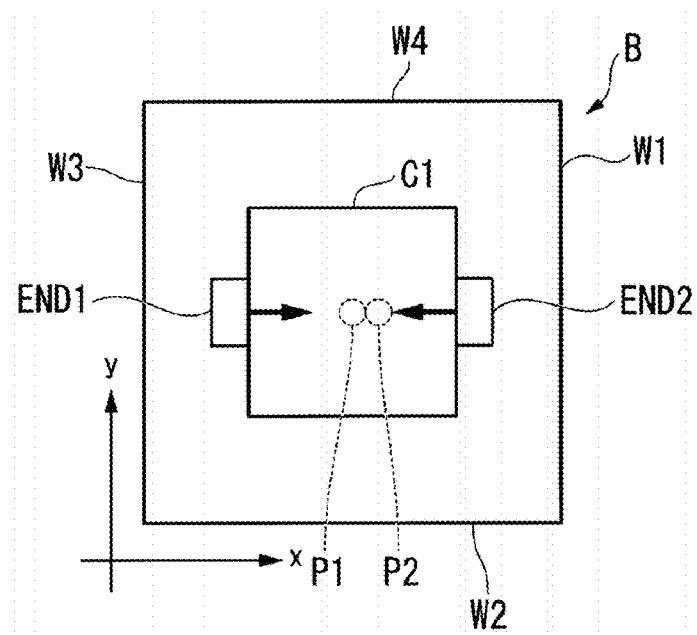
FIG. 6 shows an example of a state immediately after a packing apparatus control part allows the packing apparatus to place an object to be packed in a placement position.

FIG. 6 shows an example of a state immediately after the packing apparatus control part 45 allows the packing apparatus 20 to place the object to be packed C in the placement position (1,1). An x-coordinate and a y-coordinate of coordinate axes shown in FIG. 6 show a position in the robot coordinate system. Note that the coordinate axes are common in FIGS. 6 to 23, and the explanation will be omitted in FIGS. 7 to 23. Further, in FIGS. 6 to 23, the x-coordinate axis and the y-coordinate axis of the coordinate axes may be switched with each other. As below, the object to be packed C that is to be housed in the target box body by the packing apparatus 20 in the operation example 1 will be referred to as "object to be packed C1".

As described above, in the example, the second supply position and the placement position (1,1) show the same position and further coincide with the predetermined mounting position set on the belt. Further, in the example, the position of the predetermined portion of the target box body does not coincide with the predetermined mounting position set on the belt, but differs from the position. That is, when the packing apparatus control part 45 allows the packing apparatus 20 to operate to place the object to be packed C1 held by the both end effectors in the placement position (1,1), the packing apparatus 20 places the object to be packed in a position inside of the target box body and different from the position of the predetermined portion of the target box body as shown in FIG. 6. In the example shown in FIG. 6, a dotted circle P1 shows the placement position (1,1), i.e., the second supply position and a dotted circle P2 shows the position of the predetermined portion of the target box body. As shown in FIG. 6, the placement position (1,1) and the position of the predetermined portion of the target box body are different.

Here, for convenience of explanation, when the object to be packed C1 is placed in the placement position (1,1), four wall surfaces of the target box body surrounding the object to be packed C1 are respectively referred to as "wall surface W1", "wall surface W2", "wall surface W3", "wall surface W4" clockwise from the wall surface at the positive side of the x-coordinate axis of the robot coordinate system. These wall surfaces W1 to W4 are common in FIGS. 6 to 23, and the explanation will be omitted in FIGS. 7 to 23.

In FIG. 6, an arrow extending from the first end effector END1 shows a direction of a force applied to the object to be packed C1 by the first end effector END1 under the control based on the force sensor information. Further, in FIG. 6, an arrow extending from the second end effector END2 shows a direction of a force applied to the object to be packed C1 by the second end effector END2 under the control based on the force sensor information.

Returning to FIG. 5, then, the position information reading part 41 reads information representing a first waiting position (i,j) stored in the memory unit 32 in advance from the memory unit 32 based on the column number i and the row number j extracted at step S230 (step S250).

At step S250 in the operation example 1, the position information reading part 41 reads the information representing the first waiting position (1,1) from the memory unit 32.

The information representing the first waiting position (i,j) includes information representing a 1-1 waiting position (i,j) and information representing a 1-2 waiting position (i,j). The 1-1 waiting position (i,j) refers to a position in which the first end effector END1 is allowed to wait as advance preparation before a first positioning operation at step S280, and expressed by the robot coordinate system. Further, the 1-2 waiting position (i,j) refers to a position in which the second end effector END2 is allowed to wait as advance preparation before the first positioning operation at step S280, and expressed by the robot coordinate system. Note that, as below, for convenience of explanation, the 1-1 waiting position (i,j) and the 1-2 waiting position (i,j) will be collectively referred to as "first waiting position (i,j)" unless distinction is necessary.

Here, in the case where the first positioning operation is not necessary when the object to be packed C is housed in the housing position (i,j), the first waiting position (i,j) contains no-movement information. The no-movement information is information representing a position in which it is impossible for the packing apparatus 20 to move one or both of the first end effector END1 and the second end effector END2. For example, the no-movement information is information representing a position inside of a floor surface on which the packing apparatus 20 is installed or the like. Further, the first waiting position (i,j) containing the no-movement information refers to one or both of the information representing the 1-1 waiting position (i,j) and the information representing the 1-2 waiting position (i,j) containing the no-movement information.

Then, the determination part 47 determines whether or not the information representing the first waiting position (i,j) contains the no-movement information (step S260).

If the determination part 47 determines that the information representing the first waiting position (i,j) does not contain the no-movement information (step S260—No), the packing apparatus control part 45 moves the processing to step S270.

On the other hand, if the determination part 47 determines that the information representing the first waiting position (i,j) contains the no-movement information (step S260—Yes), the packing apparatus control part 45 moves the processing to step S290.

At step S260 in the operation example 1, the information representing the first waiting position (i,j) does not contain the no-movement information. Accordingly, in the operation example 1, only the case where the determination part 47 determines that the information representing the first waiting position (i,j) does not contain the no-movement information at step S260 will be explained.

If the determination part 47 determines that the information representing the first waiting position (i,j) does not contain the no-movement information, the packing apparatus control part 45 moves the first end effector END1 to the 1-1 waiting position (i,j) and moves the second end effector END2 to the 1-2 waiting position (i,j) based on the information representing the first waiting position (i,j). As below, moving the first end effector END1 to the 1-1 waiting position (i,j) and moving the second end effector END2 to the 1-2 waiting position (i,j) are collectively referred to as "moving both end effectors to the first waiting position (i,j)". Then, after moving both end effectors to the first waiting position (i,j), the packing apparatus control part 45 puts the state of both end effectors into a first waiting state and allows the end effectors to wait (step S270).

Here, the first waiting position (i,j) is explained. The first waiting position (i,j) is a position in which the state of both end effectors may be put into the first waiting state. The first waiting state is a state in which both end effectors wait side by side so that a straight line connecting their respective TCPs may be in parallel to the x-coordinate axis in the robot coordinate system between the object to be packed C and the wall surface of the target box body. The first waiting state is a state that satisfies the following first state conditions 1) to 6).

Condition 1) A straight line connecting the position of the TCP of the first end effector END1 and the position of the TCP of the second end effector END2 is orthogonal to a surface of the object to be packed C as a surface closest to the first end effector END1 and the second end effector END2.

Condition 2) The straight line in the condition 1 is substantially in parallel to the x-coordinate axis in the robot coordinate system.

Condition 3) The straight line in the condition 1 passes on the position of the predetermined portion of the object to be packed C.

Condition 4) Portions (surfaces) of the first end effector END1 and the second end effector END2 respectively holding the object to be packed C are substantially in parallel to the surface of the object to be packed C as the surface closest to the first end effector END1 and the second end effector END2.

Condition 5) A distance between the position of the TCP of the first end effector END1 and the position of the TCP of the second end effector END2 is a predetermined distance.

Condition 6) The position of the TCP of the first end effector END1 and the position of the TCP of the second end effector END2 exist between the object to be packed C and the wall surface of the target box body.

The predetermined distance is e.g. a distance at which the distance between the first end effector END1 and the second end effector END2 is about one centimeter, or may be another distance. Note that the predetermined distance should be a distance at which both the first end effector END1 in the first waiting position (i,j) and the second end effector END2 in the first waiting position (i,j) are within the gap between the object to be packed C and the target box body (e.g. in an example shown in FIG. 7, which will be described later, between the object to be packed C1 and the wall surface W1). Further, in the above described conditions 1) to 6), either of the position of the first end effector END1 or the position of the second end effector END2 may be located closer to the object to be packed C. In the example, the case where the first end effector END1 is located closer to the object to be packed C and the second end effector END2 is located farther from the object to be packed C will be explained.

The portion (surface) of the first end effector END1 holding the object to be packed C is e.g. a surface containing a plurality of contact points at which the respective plurality of hook portions of the first end effector END1 are in contact with the object to be packed C when the portion of the first end effector END1 holds the object to be packed C. Further, the portion (surface) of the second end effector END2 holding the object to be packed C is e.g. a surface containing a plurality of contact points at which the respective plurality of hook portions of the second end effector END2 are in contact with the object to be packed C when the portion of the second end effector END2 holds the object to be packed C. Furthermore, the first state conditions may include part of the above described conditions 1) to 6), include another condition in addition to the above described conditions 1) to 6), or include another condition without including part of the above described conditions 1) to 6).

At step S270 in the operation example 1, the packing apparatus control part 45 moves both end effectors to the first waiting position (1,1) based on the information representing the first waiting position (1,1). Then, the packing apparatus control part 45 puts the state of both end effectors into the first waiting state and allows the end effectors to wait.

Figure 7:
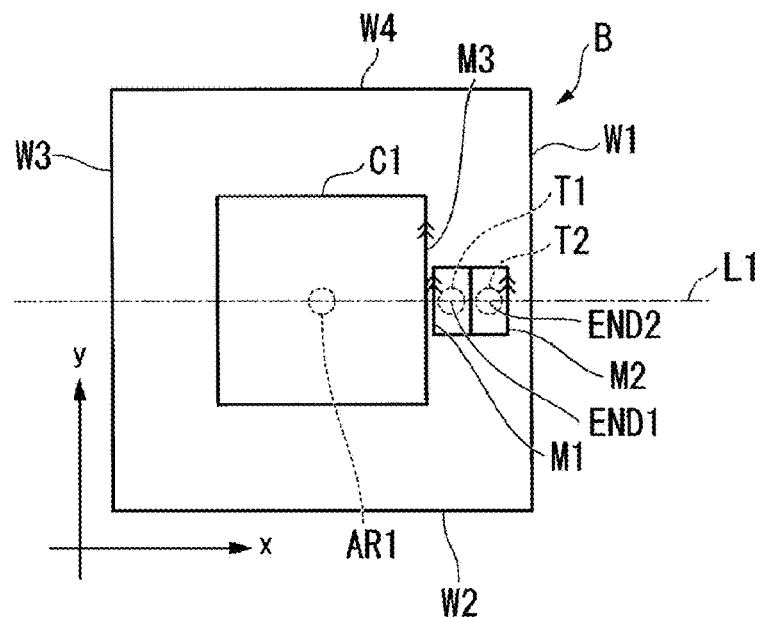
FIG. 7 shows an example of a state immediately after the packing apparatus control part moves both end effectors from the state shown in FIG. 6 to a first waiting position to put the state of both end effectors into a first waiting state.

Here, referring to FIG. 7, the first waiting state in the operation example 1 is explained.

FIG. 7 shows an example of a state immediately after the packing apparatus control part 45 moves both end effectors from the state shown in FIG. 6 to the first waiting position (1,1) to put the state of both end effectors into the first waiting state. In FIG. 7, a dotted circle T1 shows the position of the TCP of the first end effector END1. Further, a dotted circle T2 shows the position of the TCP of the second end effector END2. Furthermore, a straight line connecting the circle T1 and the circle T2 (i.e., a straight line connecting the position of the TCP of the first end effector END1 and the position of the TCP of the second end effector END2) is shown by a dashed-dotted line L1.

In FIG. 7, the portion (surface) of the first end effector END1 holding the object to be packed C1 is referred to as "surface M1", and the portion (surface) of the second end effector END2 holding the object to be packed C1 is referred to as "surface M2". Further, in FIG. 7, the surface of the object to be packed C1 closest to the first end effector END1 and the second end effector END2 is referred to as "surface M3". All of the surface 1 to surface 3 are substantially in parallel. The dashed-dotted line L1 and the surface M3 are orthogonal. The dashed-dotted line L1 passes through a dotted circle AR1 showing the placement position (1,1). Note that, in FIG. 7, suppose that the distance between the position of the TCP of the first end effector END1 and the position of the TCP of the second end effector END2 is the predetermined distance.

That is, the state of both end effectors in FIG. 7 satisfies the above described first state conditions, and is the first waiting state. There are two positions where the state of both end effectors can be put into the first waiting state within the target box body. The two positions are between the object to be packed C1 and the wall surface W1 and between the object to be packed C1 and the wall surface W3. The example in FIG. 7 shows the case where the position between the object to be packed C1 and the wall surface W1 is determined as the first waiting position (1,1) from the two positions by the user in advance.

Returning to FIG. 5, then, the packing apparatus control part 45 allows the packing apparatus 20 to perform the first positioning operation, and thereby, detects the x-coordinate of the predetermined portion of the target box body in the robot coordinate system (step S280). Here, the first positioning operation is an operation of positioning both end effectors in the first waiting state in the first waiting position (i,j) by moving both end effectors in directions in parallel to the x axis in which the first end effector END1 and the second end effector END2 separate from each other.

Figure 8:
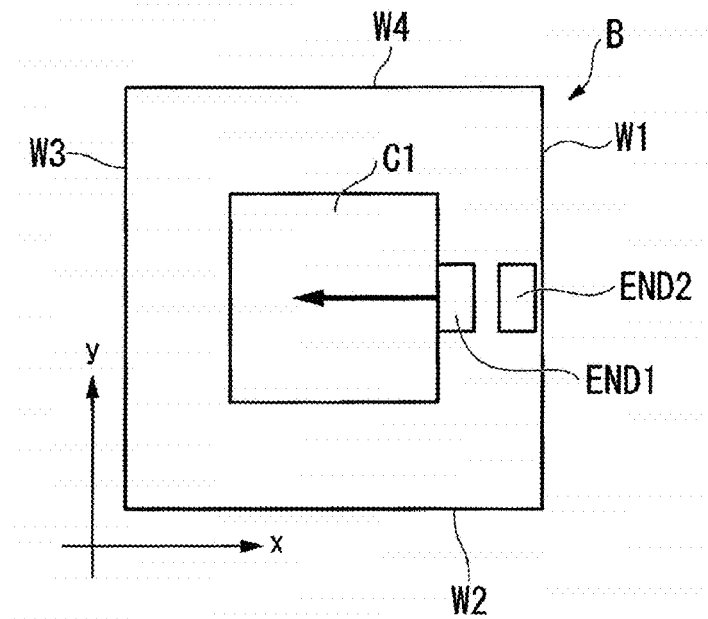
FIG. 8 shows an example of a state within a target box body immediately after the packing apparatus control part starts a first positioning operation.
Figure 9:
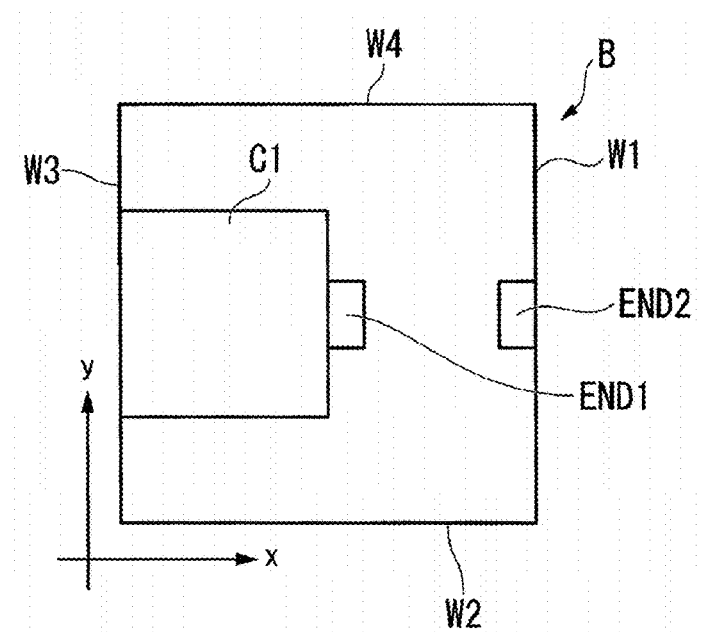
FIG. 9 shows an example of a state within the target box body immediately after the packing apparatus control part ends the first positioning operation.

Here, referring to FIGS. 8 and 9, the first positioning operation in the operation example 1 is explained.

FIG. 8 shows an example of a state within the target box body immediately after the packing apparatus control part 45 starts the first positioning operation. Further, FIG. 9 shows an example of a state within the target box body immediately after the packing apparatus control part 45 ends the first positioning operation.

The packing apparatus control part 45 moves the first end effector END1 from the position of the first end effector END1 shown in FIG. 7 toward the wall surface W3 opposite to the wall surface W1 closest to both end effectors as shown in FIG. 8 as the first positioning operation in the operation example 1. In this regard, the packing apparatus control part 45 acquires the force sensor information from the first force sensor 23-1 using the force sensor information acquisition part 44, and moves the first end effector END1 under the control based on the acquired force sensor information.

By the movement of the first end effector END1, the object to be packed C1 comes into contact with the first end effector END1 and moves with the first end effector END1. Further, by the movement of the object to be packed C1 with the first end effector END1, the wall surface W3 of the target box body comes into contact with the object to be packed C1 and moves with the first end effector END1 and the object to be packed C1. That is, the first end effector END1 applies a force to the wall surface W3 of the target box body via the object to be packed C1, and thereby, moves the target box body. The wall surface W3 of the target box body is an example of a first portion of the box body. Further, the first end effector END1 applying the force to the wall surface W3 of the target box body as the example of the first portion of the box body is an example of a first portion of the movable unit. The packing apparatus control part 45 moves the first end effector END1 until the second end effector END2 comes into contact with the wall surface W1 by the movement of the target box body.

That is, the state shown in FIG. 8 is a state immediately after the packing apparatus control part 45 brings the first end effector END1 into contact with the object to be packed C1 and starts to move the first end effector END1 remaining in contact toward the wall surface W3 opposite to the wall surface W1 closest to both end effectors. Further, the state shown in FIG. 9 is a state immediately after the second end effector END2 comes into contact with the wall surface W1, and thereby, the packing apparatus control part 45 stops the movement of the first end effector END1.

The packing apparatus control part 45 determines whether or not the wall surface W1 is in contact with the second end effector END2 by whether or not the force applied to the second end effector END2 contained in the force sensor information acquired from the second force sensor 23-2 by the force sensor information acquisition part 44 exceeds a predetermined threshold value. The wall surface W1 of the target box body is an example of a second portion of the box body. Further, the second end effector END2 with which the wall surface W1 of the target box body comes into contact as the example of the second portion of the box body is an example of a second portion of the movable unit. Note that, while moving the first end effector END1, the packing apparatus control part 45 fixes the position of the second end effector END2 under the control based on the force sensor information acquired from the second force sensor 23-2 by the force sensor information acquisition part 44.

The wall surface W1 is brought into contact with the second end effector END2 as described above, and then, the position detection part 42 detects (calculates) the x-coordinate of the predetermined portion of the target box body in the robot coordinate based on the position of the TCP of the second end effector END2, the information representing the shape and the size of the second end effector END2 contained in the packing-related information, and the information representing the shape and the size of the box body B contained in the packing-related information.

Returning to FIG. 5, then, the position information reading part 41 reads information representing a second waiting position (i,j) stored in the memory unit 32 in advance from the memory unit 32 based on the column number i and the row number j extracted at step S230 (step S290).

At step S290 in the operation example 1, the position information reading part 41 reads the information representing the second waiting position (1,1) from the memory unit 32.

The information representing the second waiting position (i,j) includes information representing a 2-1 waiting position (i,j) and information representing a 2-2 waiting position (i,j). The 2-1 waiting position (i,j) refers to a position in which the first end effector END1 is allowed to wait as advance preparation before a second positioning operation at step S320 is performed, and is expressed by the robot coordinate system. Further, the 2-2 waiting position (i,j) refers to a position in which the second end effector END2 is allowed to wait as advance preparation before the second positioning operation at step S320 is performed, and is expressed by the robot coordinate system. Note that, as below, for convenience of explanation, the 2-1 waiting position (i,j) and the 2-2 waiting position (i,j) will be collectively referred to as "second waiting position (i,j)" unless distinction is necessary.

Here, in the case where the second positioning operation is not necessary when the object to be packed C is housed in the housing position (i,j), the second waiting position (i,j) contains no-movement information. The second waiting position (i,j) containing the no-movement information refers to one or both of the information representing the 2-1 waiting position (i,j) and the information representing the 2-2 waiting position (i,j) containing the no-movement information.

Then, the determination part 47 determines whether or not the information representing the second waiting position (i,j) contains the no-movement information (step S300).

If the determination part 47 determines that the information representing the second waiting position (i,j) does not contain the no-movement information (step S300—No), the packing apparatus control part 45 moves the processing to step S310.

On the other hand, if the determination part 47 determines that the information representing the second waiting position (i,j) contains the no-movement information (step S300—Yes), the packing apparatus control part 45 moves the processing to step S200, and selects the next value for substitution for the variable r.

At step S310 in the operation example 1, the information representing the second waiting position (1,1) does not contain the no-movement information. Accordingly, in the operation example 1, only the case where the determination part 47 determines that the information representing the second waiting position (1,1) does not contain the no-movement information at step S300 will be explained.

If the determination part 47 determines that the information representing the second waiting position (i,j) does not contain the no-movement information, the packing apparatus control part 45 moves the first end effector END1 to the 2-1 waiting position (i,j) and moves the second end effector END2 to the 2-2 waiting position (i,j) based on the information representing the second waiting position (i,j). As below, moving the first end effector END1 to the 2-1 waiting position (i,j) and moving the second end effector END2 to the 2-2 waiting position (i,j) are collectively referred to as moving both end effectors to the second waiting position (i,j). Then, after moving both end effectors to the second waiting position (i,j), the packing apparatus control part 45 puts the state of both end effectors into a second waiting state and allows the end effectors to wait (step S310).

Here, the second waiting position (i,j) is explained. The second waiting position (i,j) is a position in which the state of both end effectors may be put into the second waiting state. The second waiting state is a state in which both end effectors wait side by side so that a straight line connecting their respective TCPs may be in parallel to the y-coordinate axis in the robot coordinate system between the object to be packed C and the wall surface of the target box body. The second waiting state is a state that satisfies the following second state conditions 7) to 12).

Condition 7) A straight line connecting the position of the TCP of the first end effector END1 and the position of the TCP of the second end effector END2 is orthogonal to a surface of the object to be packed C as a surface closest to the first end effector END1 and the second end effector END2.

Condition 8) The straight line in the condition 7 is substantially in parallel to the y-coordinate axis in the robot coordinate system.

Condition 9) The straight line in the condition 7 passes on the position of the predetermined portion of the object to be packed C.

Condition 10) Portions (surfaces) of the first end effector END1 and the second end effector END2 respectively holding the object to be packed C are substantially in parallel to the surface of the object to be packed C as the surface closest to the first end effector END1 and the second end effector END2.

Condition 11) A distance between the position of the TCP of the first end effector END1 and the position of the TCP of the second end effector END2 is a predetermined distance.

Condition 12) The position of the TCP of the first end effector END1 and the position of the TCP of the second end effector END2 exist between the object to be packed C and the wall surface of the target box body.

The second state conditions may include part of the above described conditions 7) to 12), include another condition in addition to the above described conditions 7) to 12), or include another condition without including part of the above described conditions 7) to 12). Further, in the above described conditions 7) to 12), either of the position of the first end effector END1 or the position of the second end effector END2 may be located closer to the object to be packed C. In the example, the case where the first end effector END1 is located closer to the object to be packed C and the second end effector END2 is located farther from the object to be packed C will be explained.

At step S310 in the operation example 1, the packing apparatus control part 45 moves both end effectors to the second waiting position (1,1) based on the information representing the second waiting position (1,1). Then, the packing apparatus control part 45 puts the state of both end effectors into the second waiting state and allows the end effectors to wait.

Figure 10:
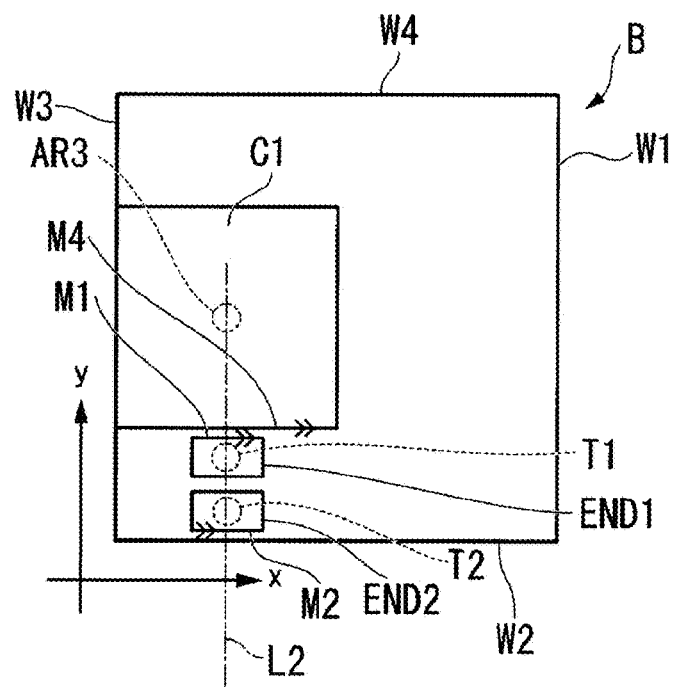
FIG. 10 shows an example of a state immediately after the packing apparatus control part moves both end effectors from the state shown in FIG. 9 to a second waiting position to put the state of both end effectors into a second waiting state.

Here, referring to FIG. 10, the second waiting state in the operation example 1 is explained.

FIG. 10 shows an example of a state immediately after the packing apparatus control part 45 moves both end effectors from the state shown in FIG. 9 to the second waiting position (1,1) to put the state of both end effectors into the second waiting state. In FIG. 10, a straight line connecting the circle T1 and the circle T2 (i.e., a straight line connecting the position of the TCP of the first end effector END1 and the position of the TCP of the second end effector END2) is shown by a dashed-dotted line L2.

In FIG. 10, the surface of the object to be packed C1 closest to the first end effector END1 and the second end effector END2 is referred to as "surface M4". All of the surface M1, the surface M2, and the surface M4 are substantially in parallel. The dashed-dotted line L2 and the surface M4 are orthogonal. The dashed-dotted line L2 passes through a dotted circle AR3 showing the predetermined portion of the target box body. Note that, in FIG. 10, suppose that the distance between the position of the TCP of the first end effector END1 and the position of the TCP of the second end effector END2 is the predetermined distance.

That is, the state of both end effectors in FIG. 10 satisfies the above described second state conditions, and is the second waiting state. There are two positions where the state of both end effectors can be put into the second waiting state within the target box body. The two positions are between the object to be packed C1 and the wall surface W2 and between the object to be packed C1 and the wall surface W4. The example shown in FIG. 10 shows the case where the position between the object to be packed C1 and the wall surface W2 is determined as the second waiting position (1,1) from the two positions by the user in advance.

Returning to FIG. 5, then, the packing apparatus control part 45 allows the packing apparatus 20 to perform the second positioning operation, and thereby, detects the y-coordinate of the predetermined portion of the target box body in the robot coordinate system (step S320). Here, the second positioning operation is an operation of positioning both end effectors in the second waiting state in the second waiting position (i,j) by moving both end effectors in directions in parallel to the y axis in which the first end effector END1 and the second end effector END2 separate from each other.

Figure 11:
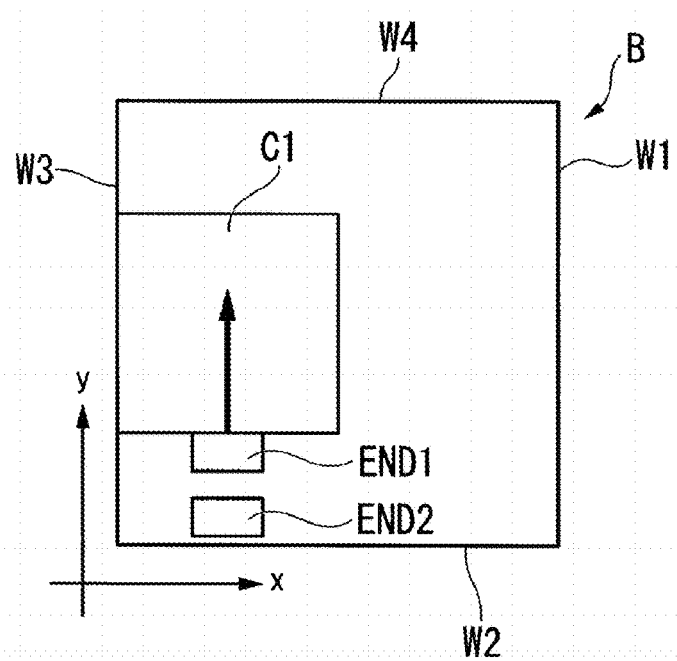
FIG. 11 shows an example of a state within the target box body immediately after the packing apparatus control part starts a second positioning operation.
Figure 12:
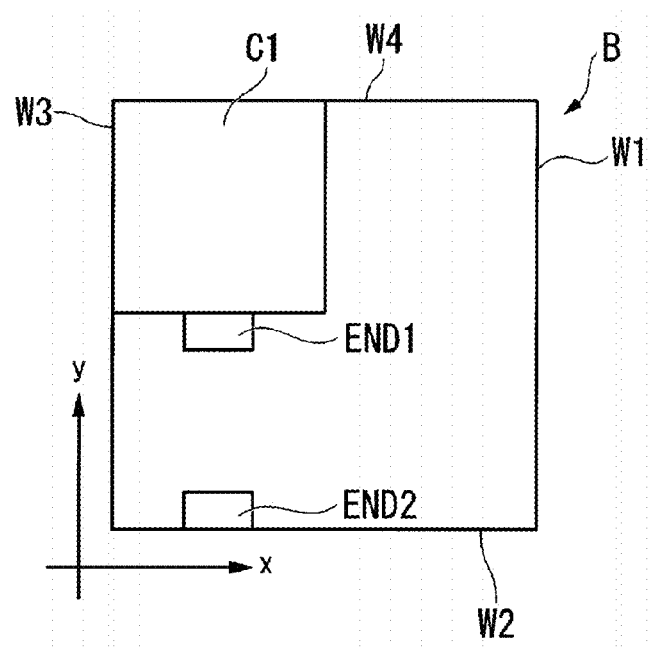
FIG. 12 shows an example of a state within the target box body immediately after the packing apparatus control part ends the second positioning operation.

Here, referring to FIGS. 11 and 12, the second positioning operation in the operation example 1 is explained. FIG. 11 shows an example of a state within the target box body immediately after the packing apparatus control part 45 starts the second positioning operation. Further, FIG. 12 shows an example of a state within the target box body immediately after the packing apparatus control part 45 ends the second positioning operation.

The packing apparatus control part 45 moves the first end effector END1 from the position of the first end effector END1 shown in FIG. 10 toward the wall surface W4 opposite to the wall surface W2 closest to both end effectors as shown in FIG. 11 as the second positioning operation. In this regard, the packing apparatus control part 45 acquires the force sensor information from the first force sensor 23-1 using the force sensor information acquisition part 44, and moves the first end effector END1 under the control based on the acquired force sensor information.

By the movement of the first end effector END1, the object to be packed C1 comes into contact with the first end effector END1 and moves with the first end effector END1. Further, by the movement of the object to be packed C1 with the first end effector END1, the wall surface W4 of the target box body comes into contact with the object to be packed C1 and moves with the first end effector END1 and the object to be packed C1. That is, the first end effector END1 applies a force to the wall surface W4 of the target box body via the object to be packed C1, and thereby, moves the target box body. The wall surface W4 of the target box body is an example of the first portion of the box body. Further, the packing apparatus control part 45 brings the object to be packed C1 into contact with the wall surface W4 of the target box body, and thereby, completes housing of the object to be packed C1 in the predetermined housing position (1,1) within the target box body. Note that the object to be packed C1 is an example of a second object. The packing apparatus control part 45 moves the first end effector END1 until the second end effector END2 comes into contact with the wall surface W2 by the movement of the target box body.

That is, the state shown in FIG. 11 is a state immediately after the packing apparatus control part 45 brings the first end effector END1 into contact with the object to be packed C1 and starts to move the first end effector END1 remaining in contact toward the wall surface W4 opposite to the wall surface W2 closest to both end effectors. Further, the state shown in FIG. 12 is a state immediately after the second end effector END2 comes into contact with the wall surface W2, and thereby, the packing apparatus control part 45 stops the movement of the first end effector END1.

The packing apparatus control part 45 determines whether or not the wall surface W2 is in contact with the second end effector END2 by whether or not the force applied to the second end effector END2 contained in the force sensor information acquired from the second force sensor 23-2 by the force sensor information acquisition part 44 exceeds a predetermined threshold value. The wall surface W2 of the target box body is an example of the second portion of the box body. Note that, while moving the first end effector END1, the packing apparatus control part 45 fixes the position of the second end effector END2 under the control based on the force sensor information acquired from the second force sensor 23-2 by the force sensor information acquisition part 44.

The wall surface W2 is brought into contact with the second end effector END2 as described above, and then, the position detection part 42 detects (calculates) the y-coordinate of the predetermined portion of the target box body in the robot coordinate system based on the position of the TCP of the second end effector END2, the information representing the shape and the size of the second end effector END2 contained in the packing-related information, and the information representing the shape and the size of the box body B contained in the packing-related information.

Through the processing from step S210 to step S320, the x-coordinate and the y-coordinate of the predetermined portion of the target box body in the robot coordinate system are detected. Accordingly, it may be possible that the packing apparatus control part 45 can house the remaining Q−1 (in the example, three) objects to be packed C in the respective housing positions (i,j) except the respective housing position (1,1) and housing position (I,J) of the target box body, however, actually, there are some cases where the x-coordinate of the target box body in the robot coordinate system differs by the second positioning operation at step S320. On this account, the packing apparatus control part 45 houses the respective objects to be packed C in the respective housing positions (i,j) except the respective housing position (1,1) and housing position (I,J) within the target box body by the processing from step S210 to step S320 again.

Operation Example 2: Regarding the Operation of Packing the Other Object to be Packed C than the Objects being the First and the Last to be Housed in the Target Box Body In the operation example 2, the value substituted for the variable r selected at step S200 shown in FIG. 5 is two or three. As below, as an example, the case where the variable r is two will be explained. In this case, the column number i and the row number j in response to the value substituted for the variable r of the moment extracted at step S230 shown in FIG. 5 are (i,j)=(2,1). Note that, when the value substituted for the variable r is three, the column number i and the row number j in response to the value substituted for the variable r of the moment are (i,j)=(1,2). Further, the placement position (i,j) in the operation example 2 is expressed as a relative position from the position of the predetermined portion of the object to be packed C housed in the target box body in the previous processing in the repeated processing from step S210 to step S330 in the flowchart shown in FIG. 5 to the placement position (i,j). As below, for convenience of explanation, the previous processing in the repeated processing from step S210 to step S330 in the flowchart shown in FIG. 5 will be simply referred to as "previous processing".

At step S210 to step 230, step S250, and step S290 in the operation example 2, the control unit 36 performs the same processing as the processing explained in the operation example 1, in which (i,j)=(1,1) is replaced by (i,j)=(2,1), and the explanation will be omitted.

At step S240 in the operation example 2, the packing apparatus control part 45 allows the packing apparatus 20 to place the object to be packed C in the placement position (2,1) based on the information representing the placement position (2,1) in the robot coordinate system calculated by the position calculation part 43.

Figure 13:
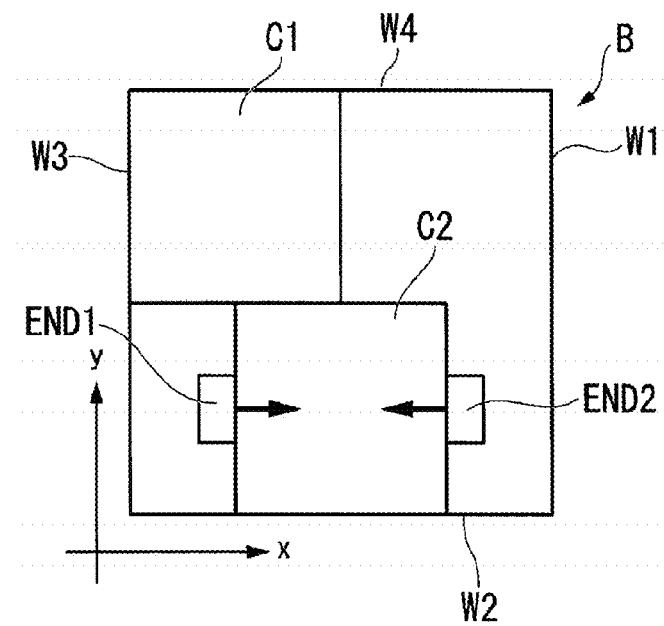
FIG. 13 shows an example of a state immediately after the packing apparatus control part allows the packing apparatus to place an object to be packed in a placement position.

Here, referring to FIG. 13, processing at step S240 in the operation example 2 is explained. Note that, as below, the object to be packed C housed in the target box body by the packing apparatus 20 in the operation example 2 will be referred to as "object to be packed C2".

FIG. 13 shows an example of a state immediately after the packing apparatus control part 45 allows the packing apparatus 20 to place the object to be packed C2 in the placement position (2,1).

In the operation example 2, the x-coordinate or y-coordinate of the predetermined portion of the target box body in the robot coordinate system is correctly determined by the latest positioning operation performed by the time immediately before. In the example, the latest positioning operation performed by the time immediately before is the second positioning operation at step S320 in the operation example 1. Accordingly, at the stage, the y-coordinate of the predetermined portion of the target box body in the robot coordinate system is correctly determined. Note that, if the value substituted for the variable r is three, the latest positioning operation performed by the time immediately before is the second positioning operation of correctly determining the x-coordinate of the predetermined portion of the target box body in the robot coordinate system in the case where the value substituted for the variable r is two.

In the example shown in FIG. 13, the y-coordinate of the predetermined portion of the target box body in the robot coordinate system is correctly determined, and thereby, the packing apparatus control part 45 may accurately place the object to be packed C2 between the object to be packed C1 and the wall surface W2 of the target box body. Note that the object to be packed C2 is an example of a first object. In FIG. 13, an arrow extending from the first end effector END1 shows a direction of a force applied to the object to be packed C2 by the first end effector END1 under the control based on the force sensor information. Further, in FIG. 13, an arrow extending from the second end effector END2 shows a direction of a force applied to the object to be packed C2 by the second end effector END2 under the control based on the force sensor information.

After the processing at step S250 in the operation example 2, the determination part 47 determines whether or not the information representing the first waiting position (i,j) contains the no-movement information at step S260 in the operation example 2.

If the determination part 47 determines that the information representing the first waiting position (i,j) does not contain the no-movement information, the packing apparatus control part 45 moves the processing to step S270.

On the other hand, if the determination part 47 determines that the information representing the first waiting position (i,j) contains the no-movement information, the packing apparatus control part 45 moves the processing to step S290.

If the x-coordinate of the predetermined portion of the target box body in the robot coordinate system has been detected immediately before the previous processing ends for the variable r=2 to Q−1, the first waiting position (i,j) contains the no-movement information. On the other hand, if the y-coordinate of the predetermined portion of the target box body in the robot coordinate system has been detected immediately before the previous processing ends for the variable r=2 to Q−1, the first waiting position (i,j) does not contain the no-movement information.

In the operation example 2, the variable r=2 and the y-coordinate of the predetermined portion of the target box body in the robot coordinate system has been detected immediately before the previous processing ends, and accordingly, only the case where the determination part 47 determines that the information representing the first waiting position (2,1) does not contain the no-movement information at step S260 in the operation example 2 will be explained.

If the determination part 47 determines that the information representing the first waiting position (2,1) does not contain the no-movement information at step S260 in the operation example 2, the packing apparatus control part 45 moves both end effectors to the first waiting position (i,j) based on the information representing the first waiting position (i,j). Then, the packing apparatus control part 45 puts the state of both end effectors into a first waiting state and allows the end effectors to wait.

Figure 14:
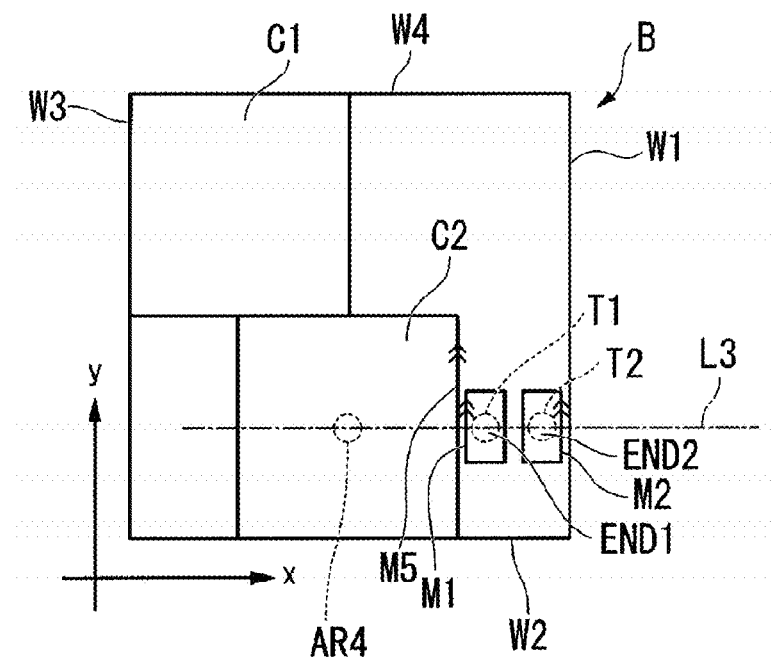
FIG. 14 shows an example of a state immediately after the packing apparatus control part moves both end effectors from the state shown in FIG. 13 to a first waiting position (2,1) to put the state of both end effectors into a first waiting state.

Here, referring to FIG. 14, the first waiting state in the operation example 2 is explained. FIG. 14 shows an example of a state immediately after the packing apparatus control part 45 moves both end effectors from the state shown in FIG. 13 to the first waiting position (2,1) to put the state of both end effectors into the first waiting state. A straight line connecting a circle T1 and a circle T2 (i.e., a straight line connecting the position of the TCP of the first end effector END1 and the position of the TCP of the second end effector END2) is shown by a dashed-dotted line L3.

Further, in FIG. 14, the surface of the object to be packed C2 closest to the first end effector END1 and the second end effector END2 is referred to as "surface M5". All of the surface M1, the surface M2, and the surface M5 are substantially in parallel. The dashed-dotted line L3 and the surface M5 are orthogonal. The dashed-dotted line L3 passes through a dotted circle AR4 showing the placement position (2,1). Note that, in FIG. 14, suppose that the distance between the position of the TCP of the first end effector END1 and the position of the TCP of the second end effector END2 is a predetermined distance.

That is, the state of both end effectors in FIG. 14 satisfies the above described second state conditions, and is the second waiting state. There are two positions where the state of both end effectors can be put into the second waiting state within the target box body. The two positions are between the object to be packed C2 and the wall surface W1 and between the object to be packed C2 and the wall surface W3. The example in FIG. 14 shows the case where the position between the object to be packed C2 and the wall surface W1 is determined as the second waiting position (2,1) from the two positions by the user in advance.

At step S280 in the operation example 2, the packing apparatus control part 45 allows the packing apparatus 20 to perform a first positioning operation, and thereby, detects the x-coordinate of the predetermined portion of the target box body in the robot coordinate system.

Figure 15:
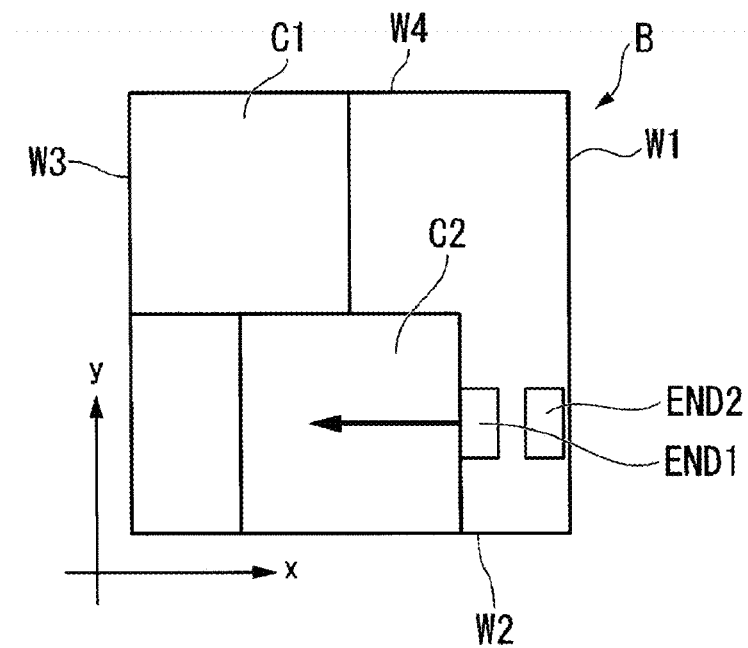
FIG. 15 shows an example of a state within the target box body immediately after the packing apparatus control part starts a first positioning operation in an operation example 2.
Figure 16:
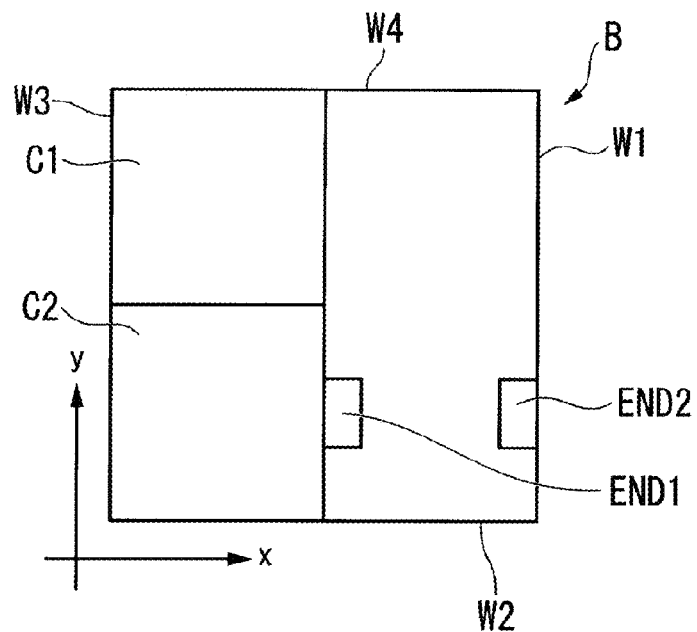
FIG. 16 shows an example of a state within the target box body immediately after the packing apparatus control part ends the first positioning operation in the operation example 2.

Here, referring to FIGS. 15 and 16, the first positioning operation in the operation example 2 is explained.

FIG. 15 shows an example of a state within the target box body immediately after the packing apparatus control part 45 starts the first positioning operation in the operation example 2. Further, FIG. 16 shows an example of a state within the target box body immediately after the packing apparatus control part 45 ends the first positioning operation in the operation example 2.

The packing apparatus control part 45 moves the first end effector END1 from the position of the first end effector END1 shown in FIG. 14 toward the wall surface W3 opposite to the wall surface W1 closest to both end effectors as shown in FIG. 15 as the first positioning operation in the operation example 2. In this regard, the packing apparatus control part 45 acquires the force sensor information from the first force sensor 23-1 using the force sensor information acquisition part 44, and moves the first end effector END1 under the control based on the acquired force sensor information.

By the movement of the first end effector END1, the object to be packed C2 comes into contact with the first end effector END1 and moves with the first end effector END1. Further, by the movement of the object to be packed C2 with the first end effector END1, the wall surface W3 of the target box body comes into contact with the object to be packed C2 and moves with the first end effector END1 and the object to be packed C2. That is, the first end effector END1 applies a force to the wall surface W3 of the target box body via the object to be packed C2, and thereby, moves the target box body. Further, the packing apparatus control part 45 brings the object to be packed C2 into contact with the wall surface W3 of the target box body, and thereby, completes housing of the object to be packed C2 in the housing position (2,1) within the target box body. The packing apparatus control part 45 moves the first end effector END1 until the second end effector END2 comes into contact with the wall surface W1 by the movement of the target box body.

That is, the state shown in FIG. 15 is a state immediately after the packing apparatus control part 45 brings the first end effector END1 into contact with the object to be packed C2 and starts to move the first end effector END1 remaining in contact toward the wall surface W3 opposite to the wall surface W1 closest to both end effectors. Further, the state shown in FIG. 16 is a state immediately after the second end effector END2 comes into contact with the wall surface W1, and thereby, the packing apparatus control part 45 stops the movement of the first end effector END1.

The packing apparatus control part 45 determines whether or not the wall surface W1 is in contact with the second end effector END2 by whether or not the force applied to the second end effector END2 contained in the force sensor information acquired from the second force sensor 23-2 by the force sensor information acquisition part 44 exceeds a predetermined threshold value. Note that, while moving the first end effector END1, the packing apparatus control part 45 fixes the position of the second end effector END2 under the control based on the force sensor information acquired from the second force sensor 23-2 by the force sensor information acquisition part 44.

The wall surface W1 is brought into contact with the second end effector END2 as described above, and then, the position detection part 42 detects (calculates) the x-coordinate of the predetermined portion of the target box body in the robot coordinate system based on the position of the TCP of the second end effector END2, the information representing the shape and the size of the second end effector END2 contained in the packing-related information, and the information representing the shape and the size of the box body B contained in the packing-related information.

Returning to FIG. 5, after the processing at step S290 in the operation example 2, the determination part 47 determines whether or not the information representing the second waiting position (i,j) contains the no-movement information at step S300 in the operation example 2.

If the determination part 47 determines that the information representing the second waiting position (i,j) does not contain the no-movement information (step S300—No), the packing apparatus control part 45 moves the processing to step S310.

On the other hand, if the determination part 47 determines that the information representing the second waiting position (i,j) contains the no-movement information, the packing apparatus control part 45 moves the processing to step S200, and selects the next value for substitution for the variable r.

If the x-coordinate of the predetermined portion of the target box body in the robot coordinate system has been detected immediately before the previous processing ends for the variable r=2 to Q−1, the first waiting position (i,j) does not contain the no-movement information. On the other hand, if the y-coordinate of the predetermined portion of the target box body in the robot coordinate system has been detected immediately before the previous processing ends for the variable r=2 to Q−1, the first waiting position (i,j) contains the no-movement information.

In the operation example 2, the variable r=2 and the y-coordinate of the predetermined portion of the target box body in the robot coordinate system has been detected immediately before the previous processing ends, and accordingly, only the case where the determination part 47 determines that the information representing the second waiting position (2,1) contains the no-movement information at step S300 in the operation example 2 will be explained.

If the determination part 47 determines that the information representing the second waiting position (2,1) contains the no-movement information at step S300 in the operation example 2, the control unit 36 moves the processing to step S200, and selects the next value for substitution for the variable r.

Through the processing from step S210 to step S320 in the operation example 2, the x-coordinate of the predetermined portion of the target box body in the robot coordinate is detected. Accordingly, it may be possible that the packing apparatus control part 45 can house the remaining Q−2 (in the example, two) objects to be packed C in the respective housing positions (i,j) except the respective housing position (1,1) and housing position (I,J) of the target box body, however, actually, there are some cases where the y-coordinate of the target box body in the robot coordinate system differs by the first positioning operation at step S280 in the operation example 2. On this account, the packing apparatus control part 45 houses the next objects to be packed C in the respective housing positions (i,j) except the respective housing position (1,1) and housing position (I,J) within the target box body by the processing from step S210 to step S320 again.

In the operation example 2, the variable r=2, and thus, the x-coordinate of the predetermined portion of the target box body in the robot coordinate system is detected by the processing from step S210 to step S320. However, for example, if the variable r=3, the control unit 36 detects the y-coordinate of the predetermined portion of the target box body in the robot coordinate system by the processing from step S210 to step S320. In this case, the first positioning operation at step S280 is not performed, but the second positioning operation at step S320 is performed. As described above, which one of the first positioning operation and the second positioning operation is performed is determined by whether or not the first waiting position (i,j) and the second waiting position (i,j) contain the no-movement information. Note that whether or not the first waiting position (i,j) of each (i,j) contains the no-movement information is determined by the shape and the size of the box body B and the shape and the size of the object to be packed. Further, whether or not the second waiting position (i,j) of each (i,j) contains the no-movement information is determined by the shape and the size of the box body B and the shape and the size of the object to be packed.

Operation Example 3: Regarding the Operation of Packing the Object to be Packed C being the Last to be Housed in the Target Box Body In the operation example 3, the value substituted for the variable r selected at step S200 shown in FIG. 5 is four. In this case, the column number i and the row number j in response to the value substituted for the variable r of the moment extracted at step S230 shown in FIG. 5 are (i,j)=(I,J)=(2,2). Further, the placement position (I,J) in the operation example 3 is expressed as a relative position from the position of the predetermined portion of the object to be packed C housed in the target box body in the previous processing to the placement position (I,J). Furthermore, at step S210 in the operation example 3, the control unit 36 performs the same processing as the processing explained in the operation example 1, in which (i,j)=(1,1) is replaced by (i,j)=(2,2), and the explanation will be omitted.

At step S220 in the operation example 3, if the determination part 47 determines that the value substituted for the variable r is Q, the position information reading part 41 reads the information representing the housing position (I,J) stored in the memory unit 32 in advance from the memory unit 32. Then, the position calculation part 43 calculates the housing position (I,J) in the robot coordinate system based on the information representing the placement position (I,J) read by the position information reading part 41 and the information representing the housing position of the object to be packed C housed in the previous processing (step S325).

Then, the packing apparatus control part 45 allows the packing apparatus 20 to place the object to be packed C in the placement position (I,J) based on the placement position (I,J) in the robot coordinate system calculated by the position calculation part 43. Further, the packing apparatus control part 45 allows the packing apparatus 20 to place the object to be packed C in the housing position (I,J) by chamferless insertion (step S330). As below, the object to be packed C housed in the target box body by the packing apparatus 20 in the operation example 3 will be referred to as "object to be packed C4". Further, the object to be packed C housed in the target box body in the previous processing for the operation example 3 will be referred to as "object to be packed C3".

Figure 17:
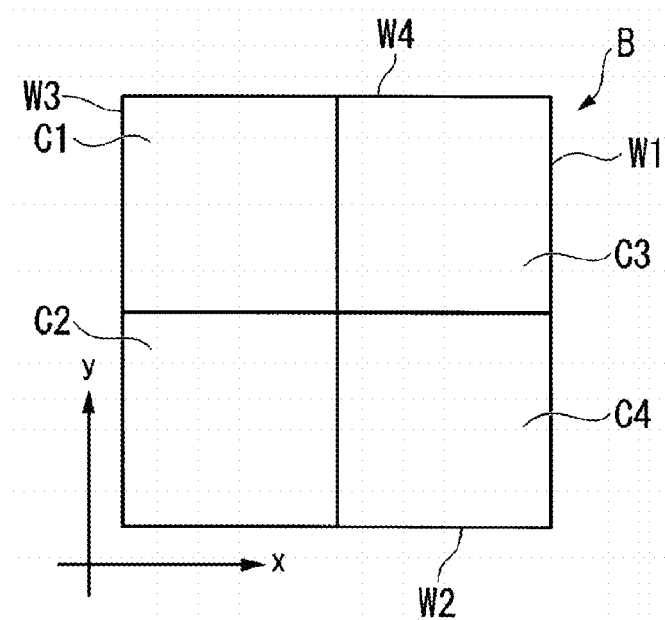
FIG. 17 shows an example of a state immediately after the packing apparatus houses and positions the object to be packed by chamferless insertion.

FIG. 17 shows an example of a state immediately after the packing apparatus 20 houses and positions the object to be packed C4 in (2,2) by chamferless insertion. In this manner, through the repeated processing from step S200 to step S330, the packing apparatus 20 of the packing system 1 may accurately house the objects to be packed even in an unfixed target box body.

Modified Example 1 of Embodiment

As below, a modified example 1 of the embodiment of the invention will be explained with reference to the drawings.

A packing system 1 according to the modified example 1 of the embodiment performs positioning of a target box body without the object to be packed C inside of the target box body.

Figure 18:
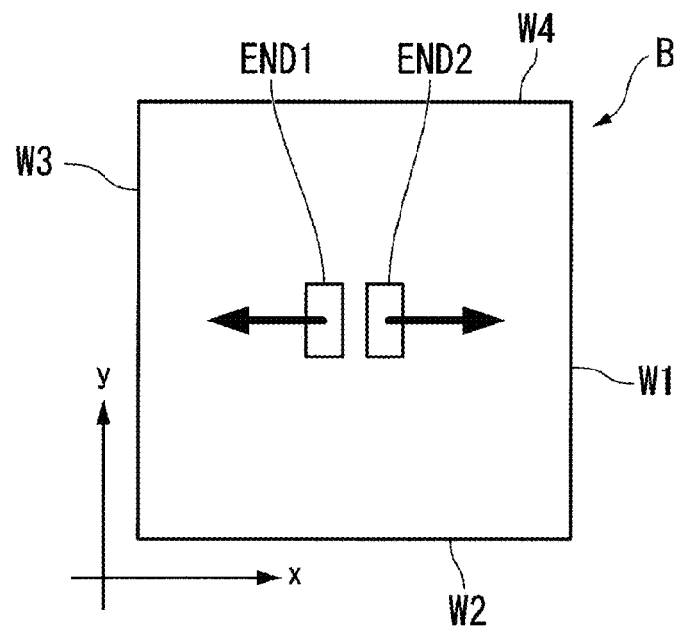
FIG. 18 shows an example of a state immediately before positioning of the target box body without the object to be packed in the target box body.
Figure 19:
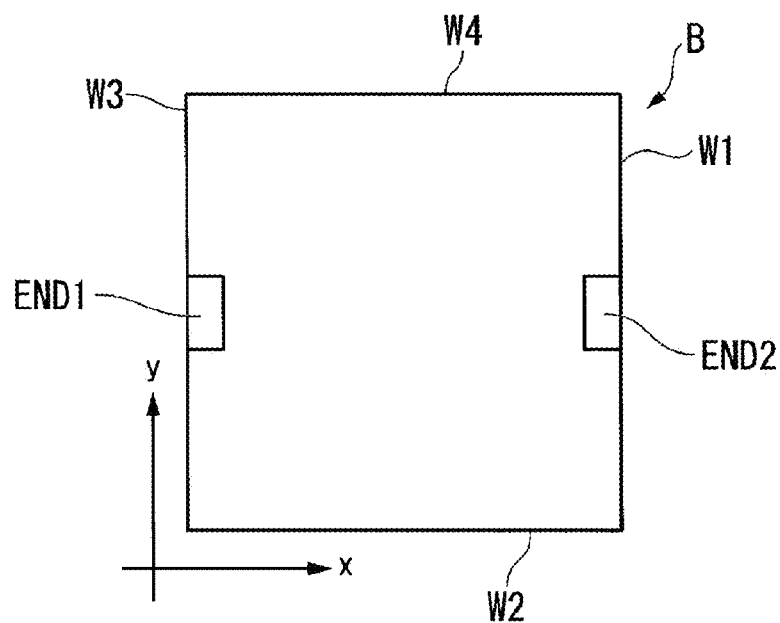
FIG. 19 shows an example of a state immediately after positioning of the target box body without the object to be packed in the target box body.

FIG. 18 shows an example of a state immediately before positioning of the target box body without the object to be packed C in the target box body. FIG. 19 shows an example of a state immediately after positioning of the target box body without the object to be packed C in the target box body.

For example, as shown in FIG. 18, the packing apparatus control part 45 allows both end effectors to wait inside of the target box body (a region surrounded by the wall surfaces W1 to W4 of the target box body) so that both end effectors may fall within a circle having a predetermined radius around the second supply position. Then, the packing apparatus control part 45 moves the first end effector END1 and the second end effector END2 along arrows in parallel to the x-coordinate axis shown in FIG. 18. More specifically, the packing apparatus control part 45 moves the first end effector END1 toward the wall surface W3 of the target box body and moves the second end effector END2 toward the wall surface W1 of the target box body. The packing apparatus control part 45 moves both end effectors until both the first end effector END1 and the second end effector END2 come into contact with the wall surfaces of the target box body.

Whether or not both end effectors come into contact with the wall surfaces of the target box body is determined by whether or not both of the forces respectively applied to both end effectors contained in the force sensor information acquired from the force sensors 23 by the force sensor information acquisition part 44 exceed a predetermined threshold value. As shown in FIG. 19, when both end effectors come into contact with the wall surfaces of the target box body, the packing apparatus control part 45 stops movements of both end effectors. In the state shown in FIG. 19, the position calculation part 43 detects the x-coordinate of the predetermined portion of the target box body in the robot coordinate system based on one or both of the position of the TCP of the first end effector END1 and the position of the TCP of the second end effector END2 and the information representing the shape and the size of the box body contained in the packing-related information.

Further, the packing apparatus control part 45 and the position calculation part 43 perform the same processing as the detection of the x-coordinate with respect to the directions in parallel to the y-coordinate axis in the same manner, and thereby, detect the y-coordinate of the predetermined portion of the target box body in the robot coordinate system.

The position calculation part 43 may accurately calculate the housing position (i,j) based on these x-coordinate and y-coordinate (i.e., the position of the predetermined portion of the target box body in the robot coordinate system). As a result, the control unit 36 of the control apparatus 30 may accurately house the objects to be packed even in an unfixed box body. Note that the housing position (i,j) includes the respective housing position (1,1) to housing position (I,J).

Further, the packing system 1 according to the modified example 1 of the embodiment may be adapted to move only one of the first end effector END1 and the second end effector END2 in the state shown in FIG. 18. That is, the packing system 1 may be adapted to fix one of the first end effector END1 and the second end effector END2 under the control based on the force sensor information acquired from the force sensor information acquisition part 44 in the state shown in FIG. 18.

Modified Example 2 of Embodiment

As below, a modified example 2 of the embodiment of the invention will be explained with reference to the drawings.

A packing system 1 according to the modified example 2 of the embodiment performs positioning of a target box body with the first end effector END1 and the second end effector END2 waiting outside of the target box body.

Figure 20:
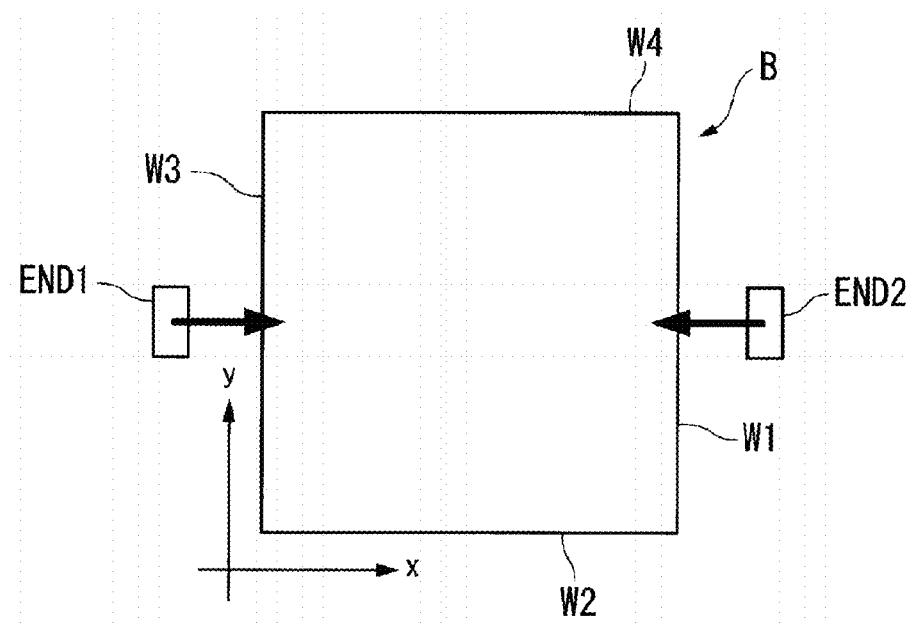
FIG. 20 shows an example of a state in which both a first end effector and a second end effector are allowed to wait outside of the target box body.
Figure 21:
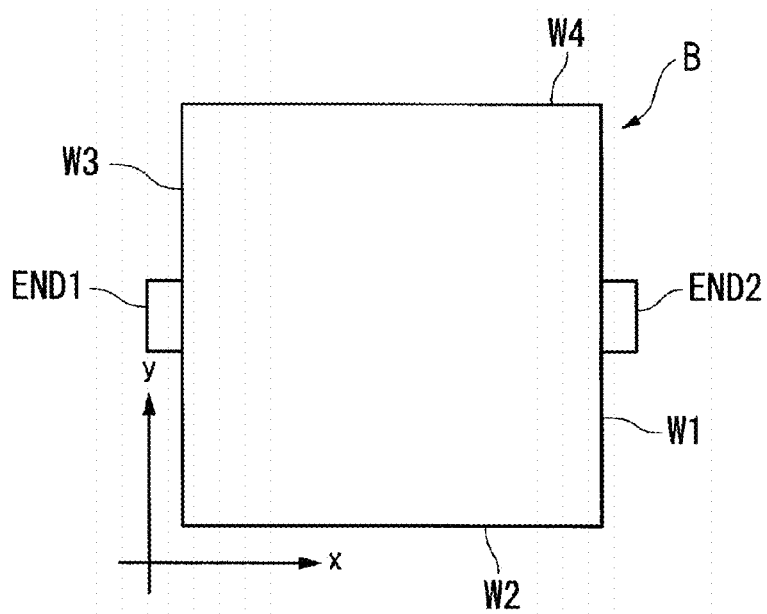
FIG. 21 shows an example of a state immediately after positioning of the target box body from the state in which both the first end effector and the second end effector are allowed to wait outside of the target box body.

FIG. 20 shows an example of a state in which both the first end effector and the second end effector are allowed to wait outside of the target box body. FIG. 21 shows an example of a state immediately after positioning of the target box body from the state in which both the first end effector and the second end effector are allowed to wait outside of the target box body. Note that, in the example shown in FIGS. 20 and 21, the case where the object to be packed C is not placed inside of the target box body is shown, however, the object to be packed C may be placed inside of the target box body instead.

The packing apparatus control part 45 moves one or both of the first end effector END1 and the second end effector END2 along arrows shown in FIG. 20 until the wall surfaces of the target box body come into contact with both the first end effector END1 and the second end effector END2 in the state shown in FIG. 21 from the state shown in FIG. 20. Then, the position detection part 42 detects (calculates) the x-coordinate of the predetermined portion of the target box body in the robot coordinate system based on one or both of the position of the TCP of the first end effector END1 and the position of the TCP of the second end effector END2 and the information representing the shape and the size of the target box body contained in the packing-related information in the state shown in FIG. 21. Further, the packing apparatus control part 45 and the position calculation part 43 perform the same processing as the detection of the x-coordinate with respect to the directions in parallel to the y-coordinate axis in the same manner, and thereby, detect the y-coordinate of the predetermined portion of the target box body in the robot coordinate system.

The position calculation part 43 may accurately calculate the housing position (i,j) based on these x-coordinate and y-coordinate (i.e., the position of the predetermined portion of the target box body in the robot coordinate system). As a result, the control unit 36 of the control apparatus 30 may accurately house the objects to be packed even in an unfixed box body. Note that the housing position (i,j) includes the respective housing position (1,1) to housing position (I,J).

Modified Example 3 of Embodiment

As below, a modified example 3 of the embodiment of the invention will be explained with reference to the drawings.

A packing system 1 according to the modified example 3 of the embodiment performs positioning of a target box body with one of the first end effector END1 and the second end effector END2 waiting outside of the target box body and the other waiting inside of the target box body.

Figure 22:
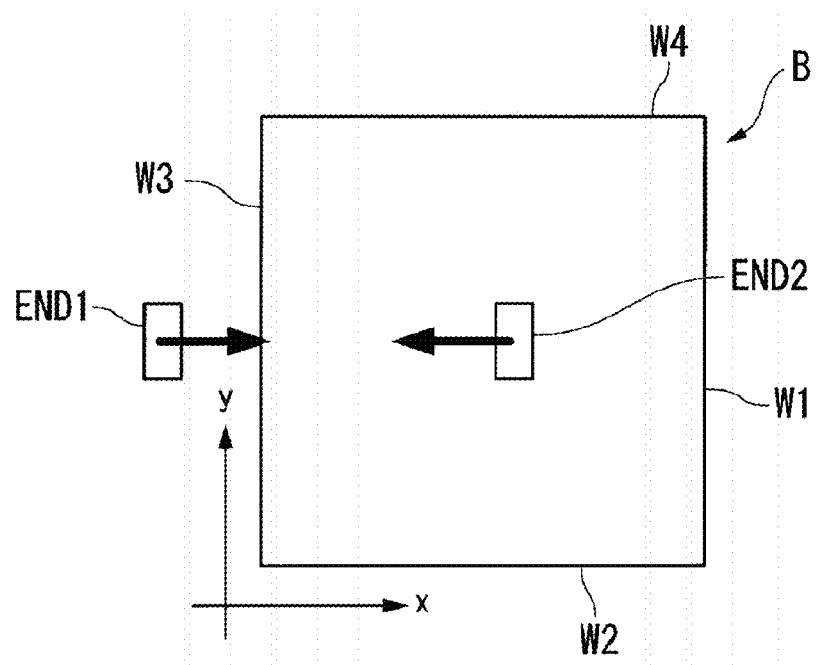
FIG. 22 shows an example of a state in which the first end effector is allowed to wait outside of the target box body and the second end effector is allowed to wait inside of the target box body.
Figure 23:
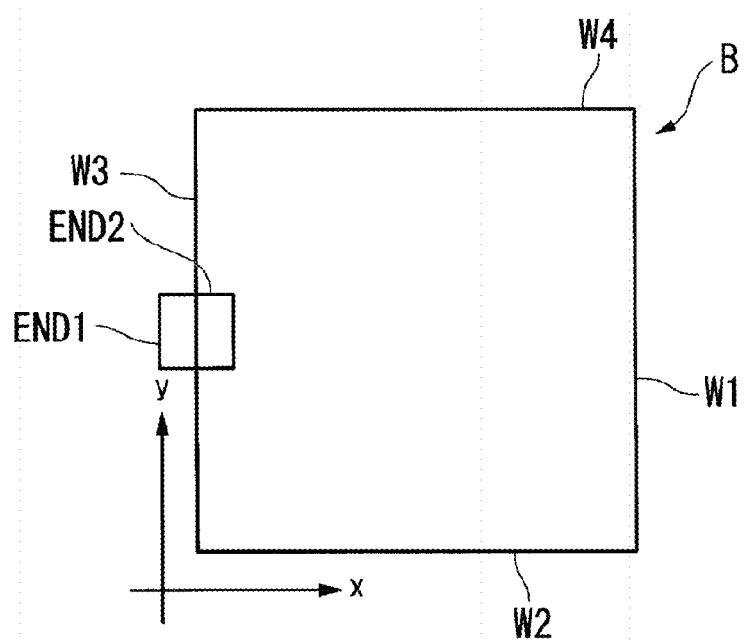
FIG. 23 shows an example of a state immediately after positioning of the target box body from the state in which the first end effector is allowed to wait outside of the target box body and the second end effector is allowed to wait inside of the target box body.

FIG. 22 shows an example of a state in which the first end effector END1 is allowed to wait outside of the target box body and the second end effector END2 is allowed to wait inside of the target box body. FIG. 23 shows an example of a state immediately after positioning of the target box body from the state in which the first end effector END1 is allowed to wait outside of the target box body and the second end effector END2 is allowed to wait inside of the target box body. In the example shown in FIGS. 22 and 23, the case where the object to be packed C is not placed between the wall surface W3 of the target box body and the second end effector END2 is shown, however, the object to be packed C may be placed between the wall surface W3 of the target box body and the second end effector END2 instead.

The packing apparatus control part 45 moves one or both of the first end effector END1 and the second end effector END2 along arrows shown in FIG. 22 from the state shown in FIG. 22. Then, the position detection part 42 detects (calculates) the x-coordinate of the predetermined portion of the target box body in the robot coordinate system based on one or both of the position of the TCP of the first end effector END1 and the position of the TCP of the second end effector END2 and the information representing the shape and the size of the target box body contained in the packing-related information in the state shown in FIG. 23. Further, the packing apparatus control part 45 and the position calculation part 43 perform the same processing as the detection of the x-coordinate system with respect to the directions in parallel to the y-coordinate axis in the same manner, and thereby, detect the y-coordinate of the predetermined portion of the target box body in the robot coordinate system.

The position calculation part 43 may accurately calculate the housing position (i,j) based on these x-coordinate and y-coordinate (i.e., the position of the predetermined portion of the target box body in the robot coordinate system). As a result, the control unit 36 of the control apparatus 30 may accurately house the objects to be packed even in an unfixed box body. Note that the housing position (i,j) includes the respective housing position (1,1) to housing position (I,J).

In the respective processing of the above described embodiment and modified examples of the embodiment, the roles of the first arm and the second arm may be reversed.

As described above, the packing apparatus 20 in the embodiment houses objects to be packed C in a box body N formed from a packing material based on the force sensor information acquired from the force sensor information acquisition part 44. Thereby, the packing apparatus 20 may house the objects to be packed C in the box body B under the control based on the force sensor information and, as a result, may accurately house the objects to be packed C in the box body B not fixed to the mounting surface.

Further, the packing apparatus 20 moves the box body B by applying a force by the first portion (in the example, the first end effector END1) of the movable unit to the first portion (e.g. the wall surface W3) of the box body B, allows the second portion of the movable unit (in the example, the second end effector END2) of the movable unit to come into contact with the second portion (e.g. the wall surface W1) of the box body B, performs positioning of the box body B based on the force sensor information acquired by the force sensor information acquisition part 44, and houses the object to be packed C in the box body B. Thereby, the packing apparatus 20 may accurately house the object to be packed C in the box body B based on the positioning of the box body B.

Furthermore, the packing apparatus 20 places a first object to be packed (e.g. the object to be packed C2) of the objects to be packed C in the box body by one or both of the first portion of the movable unit and the second portion of the movable unit based on the positioning of the box body B. Thereby, for example, the packing apparatus 20 may suppress placement of the first object to be packed in an unintended location outside of the box body B or the like.

In the packing apparatus 20, the first portion of the movable unit applies a force to the first portion of the box body B via a second object to be packed (e.g. the object to be packed C1) of the objects to be packed C. Thereby, the packing apparatus 20 may apply the force to the first portion of the box body B while moving the second object to be packed within the box body B.

Further, the packing apparatus 20 houses the second object to be packed in a predetermined housing position (e.g. (the housing position (1,1)) by positioning the box body. Thereby, the packing apparatus 20 may suppress the difference of the position of the box body B produced when the positioning of the box body B and the housing of the second object to be packed are performed by separate operations.

Furthermore, the packing apparatus 20 applies the force to the first portion of the box body B by placing the second object to be packed in a predetermined placement position (e.g. the placement position (1,1)) of the box body B and moving and allowing the second object to be packed to come into contact with the first portion of the box body B by the first portion of the movable unit. Thereby, the packing apparatus 20 may perform positioning of the box body B after placing the second object inside of the box body B even when the position of the box body B differs.

Moreover, the packing apparatus 20 applies the force to the first portion of the box body B by placing the second object to be packed substantially at the center of the bottom surface of the box body B and moving and allowing the second object to be packed to come into contact with the first portion by the first end effector END1. Thereby, the packing apparatus 20 may perform positioning of the box body B after placing the second object to be packed inside of the box body B more reliably even when the position of the box body B differs.

The packing apparatus 20 houses the object to be packed C in a box body B formed from a folded packing material based on the force sensor information acquired from the force sensor information acquisition part 44. Thereby, the packing apparatus 20 may house the object to be packed C in the box body B formed from the folded packing material under the control based on the force sensor information and, as a result, may accurately house the object to be packed C even in the box body B not fixed to the mounting surface.

Second Embodiment

As below, the embodiment of the invention will be explained with reference to the drawings.

Figure 24:
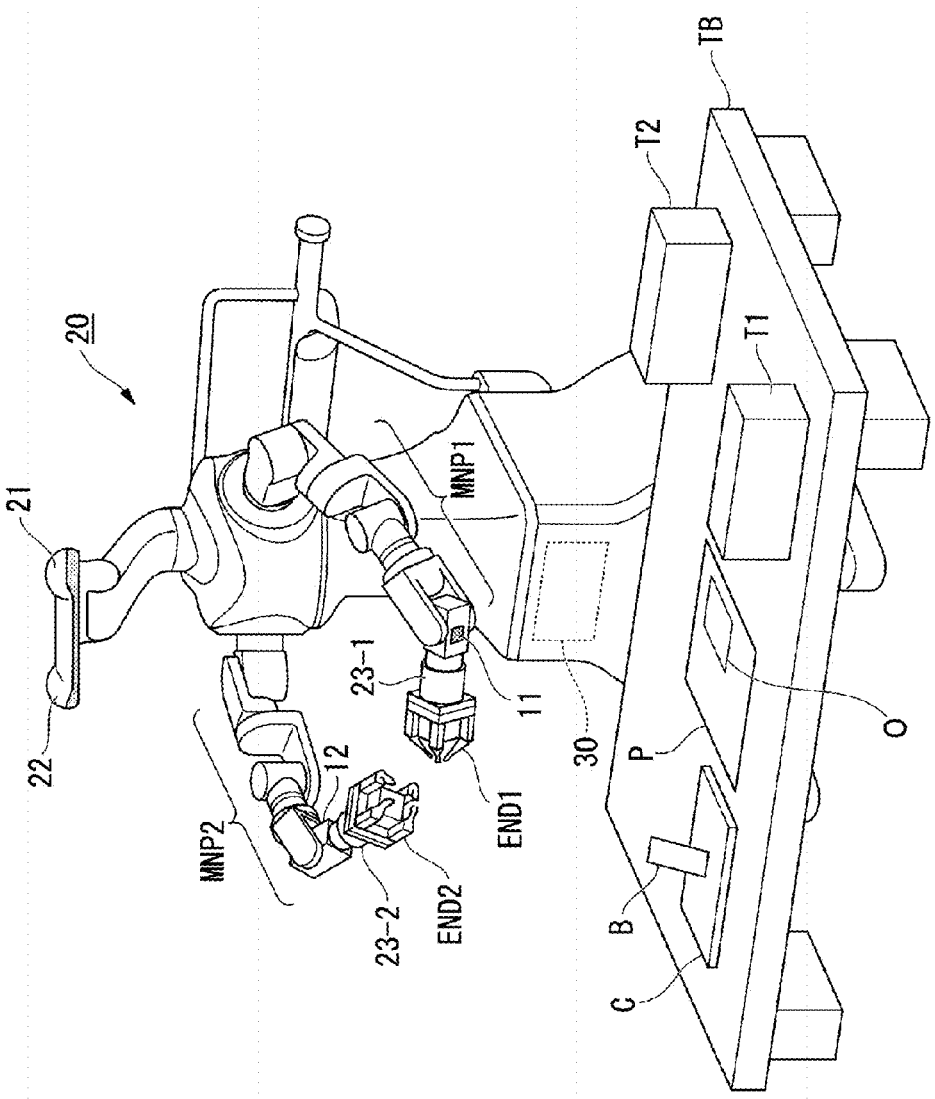
FIG. 24 is a configuration diagram showing an example of a robot according to the second embodiment.

FIG. 24 is a configuration diagram showing an example of a robot (packing apparatus) 20 according to the embodiment.

The robot 20 grasps a packing material P placed on a workbench TB.

The workbench TB is e.g. a table. In the example, the packing material P, a cutter C, a supply container T1, and a removal container T2 are placed on the upper surface of the workbench TB. Note that, in place of the table, the workbench TB may be another object such as a floor surface or a rack as long as the packing material P, the cutter C, the supply container T1, and the removal container T2 may be placed on the object. Further, the workbench TB may include a plurality of benches, e.g. a first bench and a second bench. In this case, one part of the packing material P, the cutter C, the supply container T1, and the removal container T2 is placed on the first bench and the other part is placed on the second bench.

The packing material P is a bag-shaped object formed using a flexible material, so that an object may be packed inside. In the example, the case where an object is packed inside of the packing material P and hermetically sealed not to get out of the packing material P, and the packing material has a rectangular shape will be explained. In the example, the flexible material refers to a material that can deform due to influences by the movement of the robot 20, gravity, wind, etc. such as soft matter. Further, the flexible material forming the packing material P is a transparent or translucent material in the example, however, may be an opaque material.

That is, regarding the packing material P, a housing status of the object packed inside of the packing material P can be detected from outside of the packing material P. In the example, the case where the flexible material forming the packing material P is plastic will be explained, however, the material may be another material including a see-through fabric (meshed fabric or the like), film, and biomembrane instead. Note that the packing material P may be a material that does not deform due to influences by the movement of the robot 20, gravity, wind, etc. (an elastic material or a rigid material) in place of the flexible material.

Figure 25:
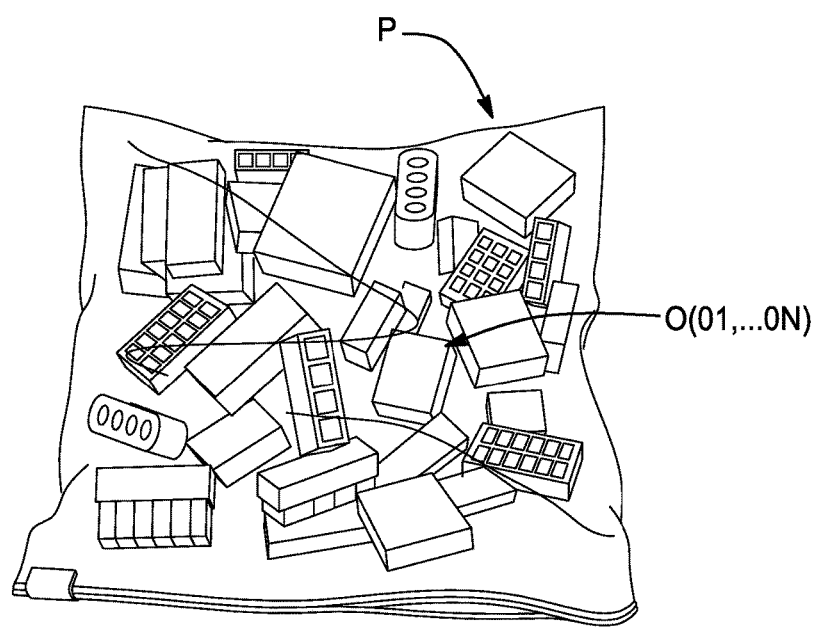
FIG. 25 shows an example of a packing material.

Here, referring to FIG. 25, the packing material P is explained.

FIG. 25 shows an example of the packing material P. As shown in FIG. 25, the material of the packing material P is a transparent plastic. Further, N objects O1 to ON are packed inside of the packing material P as the above described objects packed inside of the packing material P.

As below, for convenience of explanation, the object O1 to the object ON will be collectively referred to as "objects O" unless distinction is necessary. The objects O are e.g. objects such as processed products industrially processed and parts, however, may be other objects. Note that part or all of the objects O may be objects having different shapes, sizes, weights, etc. from one another, or objects having the same shape, size, weight, etc. As below, the case where all of the objects O have same shape, size, and weight will be explained as an example.

When grasping the packing material P, the robot 20 grasps the position of the packing material P determined based on the housing status of the objects O packed inside of the packing material P, and performs predetermined work. Thereby, the robot 20 may perform work while grasping the position in response to the housing status of the objects O packed inside of the packing material P. As below, a method of grasping the position of the packing material P determined based on the housing status of the objects O packed inside of the packing material P when the robot 20 grasps the packing material P will be explained in detail. Further, as below, for convenience of explanation, packing inside of the packing material P will be referred to as packing in the packing material P.

The predetermined work is e.g. unpacking of the packing material P, or may be other work such as housing of the packing material P in a box or the like. In the example, the case where the robot 20 performs unpacking of the packing material P, supply of the objects O packed in the packing material P to the supply container T1, and removal of the packing material P to the removal container T2 after supply of the objects O to the supply container T1 (i.e., empty packing material P) as the predetermined work will be explained.

The robot 20 unpacks the packing material P shown in FIG. 25 using the cutter C. In the example, regarding the cutter C, a blade B is provided on a support as shown in FIG. 24. Further, the cutter C is provided in the position where the robot 20 can unpack the packing material P by pressing the material to the blade B. The robot 20 cuts and unpacks the packing material P by pressing the material to the blade B.

After unpacking the packing material P, the robot 20 supplies the objects O packed in the packing material P to the supply container T1 by taking the objects outside of the packing material P. That is, the robot 20 mounts the objects O packed in the packing material P from inside of the packing material P into the supply container T1. Then, the robot 20 removes (disposes, discards) the packing material P after supply of the objects O to the supply container T1 into the removal container T2. Note that the packing material P is an empty packing material P. When the packing material P after supply of the objects O to the supply container T1 is a reusable packing material, the robot 20 may have a configuration of reusing the packing material P in place of the configuration of removing the packing material P into the removal container T2.

The supply container T1 is a container for housing the objects O packed in the packing material P and is provided in the position where the objects O can be supplied from the packing material P by the robot 20. The removal container T2 is a container for housing the empty packing material P after supply of the objects O to the supply container T1, and is provided in the position where the empty packing material P can be removed by the robot 20. The position of the removal container T2 is an example of a predetermined location.

Here, various functional parts of the robot 20 and the control apparatus 30 are explained.

The robot 20 is a dual-arm robot including e.g. a first imaging part 11, a second imaging part 12, a third imaging part 21, a fourth imaging part 22, a first force sensor 23-1, a second force sensor 23-2, a first end effector END1, a second end effector END2, a first manipulator MNP1, a second manipulator MNP2, and a plurality of actuators (not shown).

The dual-arm robot refers to a robot having two arms and, in the embodiment, has two arms of an arm including the first end effector END1 and the first manipulator MNP1 (hereinafter, referred to as "first arm") and an arm including the second end effector END2 and the second manipulator MNP2 (hereinafter, referred to as "second arm").

Note that the robot 20 may be a single-arm robot in place of the dual-arm robot. The single-arm robot refers to a robot having a single arm and e.g. a robot having one of the above described first arm and second arm.

The first arm is of a seven-axis vertical articulated type in which a support, the first manipulator MNP1, and the first end effector END1 perform operations with seven-axis degrees of freedom by cooperative operations by the actuators. Note that the first arm may operate with the six degrees of freedom (six axis) or less, or operate with eight degrees of freedom (eight axis) or more. Further, the first end effector END1 is an example of a first grasping part.

When the first arm operates with the seven degrees of freedom, the number of attitudes that can be taken by the first arm is larger compared to the case of operations with the six degrees of freedom or less, and thereby, for example, the operation becomes smoother and interferences with objects existing around the first arm may be easily avoided. Further, when the first arm operates with the seven degrees of freedom, the control of the first arm is easier because the amount of calculation is smaller compared to the case of operations with the eight degrees of freedom or more. For the reason, in the example, it is desirable that the first arm operates with the seven degrees of freedom. Note that the first arm may operate with the six degrees of freedom or less or operate with eight degrees of freedom or more.

The respective first manipulator MNP1, first end effector END1, and plurality of actuators (not shown) of the first arm are communicably connected to the control apparatus 30 by e.g. cables. Wired communication via the cable is performed by e.g. a standard of Ethernet (registered trademark), USB, or the like. Note that the respective first manipulator MNP1, first end effector END1, and plurality of actuators (not shown) of the first arm and the control apparatus 30 may be connected via wireless communication performed by a communication standard of Wi-Fi (registered trademark) or the like. Further, the first arm includes the first imaging part 11.

The first imaging part 11 is a camera including e.g. a CCD (Charge Coupled Device), a CMOS (Complementary Metal Oxide Semiconductor), or the like as an imaging device that converts focused light into electric signals.

The first imaging part 11 is communicably connected to the control apparatus 30 by a cable. Wired communication via the cable is performed by e.g. a standard of Ethernet (registered trademark), USB, or the like. Note that the first imaging part 11 and the control apparatus 30 may be adapted to be connected via wireless communication performed by a communication standard of Wi-Fi (registered trademark) or the like. The first imaging part 11 is provided in a part of the first manipulator MNP1 forming the first arm as shown in FIG. 24, and movable according to the movement of the first arm.

The second arm is of a seven-axis vertical articulated type in which a support, the second manipulator MNP2, and the second end effector END2 perform operations with seven-axis degrees of freedom by cooperative operations by the actuators. It is desirable that the second arm operates with seven degrees of freedom for the same reason as the reason that the first arm desirably operates with seven degrees of freedom. Note that the second arm may operate with the six degrees of freedom (six axis) or less, or operate with eight degrees of freedom (eight axis) or more. The second end effector END2 is an example of a second grasping part.

The respective second manipulator MNP2, second end effector END2, and plurality of actuators (not shown) of the second arm are communicably connected to the control apparatus 30 by e.g. cables. Wired communication via the cable is performed by e.g. a standard of Ethernet (registered trademark), USB, or the like. Note that the respective second manipulator MNP2, second end effector END2, and plurality of actuators (not shown) of the second arm and the control apparatus 30 may be connected via wireless communication performed by a communication standard of Wi-Fi (registered trademark) or the like. Further, the second arm includes the second imaging part 12.

The second imaging part 12 is a camera including e.g. a CCD, a CMOS, or the like as an imaging device that converts focused light into electric signals.

The second imaging part 12 is communicably connected to the control apparatus 30 by a cable. Wired communication via the cable is performed by e.g. a standard of Ethernet (registered trademark), USB, or the like. Note that the second imaging part 12 and the control apparatus 30 may be adapted to be connected via wireless communication performed by a communication standard of Wi-Fi (registered trademark) or the like. The second imaging part 12 is provided in a part of the second manipulator MNP2 forming the second arm as shown in FIG. 24, and movable according to the movement of the second arm.

The third imaging part 21 is a camera including e.g. a CCD, a CMOS, or the like as an imaging device that converts focused light into electric signals. The third imaging part 21 is communicably connected to the control apparatus 30 by a cable. Wired communication via the cable is performed by e.g. a standard of Ethernet (registered trademark), USB, or the like. Note that the third imaging part 21 and the control apparatus 30 may be connected via wireless communication performed by a communication standard of Wi-Fi (registered trademark) or the like. The third imaging part 21 is provided in a position where the part can image a range containing the packing material P, the cutter C, the supply container T1, and the removal container T2. As below, for convenience of explanation, the range containing the packing material P, the cutter C, the supply container T1, and the removal container T2 will be referred to as "imaging range". Note that the third imaging part 21 may capture a still image of the imaging range as a first captured image or capture a moving image of the imaging range as the first captured image. Further, the third imaging part 21 images the imaging range.

The fourth imaging part 22 is a camera including e.g. a CCD, a CMOS, or the like as an imaging device that converts focused light into electric signals. The fourth imaging part 22 is communicably connected to the control apparatus 30 by a cable. Wired communication via the cable is performed by e.g. a standard of Ethernet (registered trademark), USB, or the like. Note that the fourth imaging part 22 and the control apparatus 30 may be connected via wireless communication performed by a communication standard of Wi-Fi (registered trademark) or the like. The fourth imaging part 22 is provided in a position where the part can image the imaging range. Note that the fourth imaging part 22 may capture a still image of the imaging range as a second captured image or capture a moving image of the imaging range as the second captured image. Further, the fourth imaging part 22 images the imaging range.

As below, in the example, the case where the third imaging part 21 and the fourth imaging part 22 perform stereo imaging of the imaging range. Accordingly, as below, for convenience of explanation, the first captured image and the second captured image will be collectively referred to as "stereo-captured images". Note that the robot 20 may have a configuration in which the imaging range is stereo-imaged by an arbitrary combination of two of the third imaging part 21, the fourth imaging part 22, the first imaging part 11, and the second imaging part 12 in place of the configuration in which the imaging range is stereo-imaged by the third imaging part 21 and the fourth imaging part 22. Or, the robot 20 may have a configuration in which the imaging range is imaged by one of the third imaging part 21, the fourth imaging part 22, the first imaging part 11, and the second imaging part 12 in place of the configuration in which the imaging range is stereo-imaged by two imaging parts. Or, the robot 20 may have a configuration in which the imaging range is imaged by part or all of the third imaging part 21, the fourth imaging part 22, the first imaging part 11, and the second imaging part 12 in place of the configuration in which the imaging range is stereo-imaged by two imaging parts. Or, one or both of the third imaging part 21 and the fourth imaging part 22 may be provided separately from the robot 20 in the position where the part can image the imaging range.

The first force sensor 23-1 is provided between the first end effector END1 and the first manipulator MNP1 of the robot 20. The first force sensor 23-1 is communicably connected to the control apparatus 30 by a cable. Wired communication via the cable is performed by e.g. a standard of Ethernet (registered trademark), USB, or the like. Note that the first force sensor 23-1 and the control apparatus 30 may be connected via wireless communication performed by a communication standard of Wi-Fi (registered trademark) or the like. The first force sensor 23-1 detects a force and moment acting on the first end effector END1. The first force sensor 23-1 outputs information representing the detected force and moment (hereinafter, referred to as "force sensor information") to the control apparatus 30 by communication.

The second force sensor 23-2 is provided between the second end effector END2 and the second manipulator MNP2. The second force sensor 23-2 is communicably connected to the control apparatus 30 by a cable. Wired communication via the cable is performed by e.g. a standard of Ethernet (registered trademark), USB, or the like. Note that the second force sensor 23-2 and the control apparatus 30 may be connected via wireless communication performed by a communication standard of Wi-Fi (registered trademark) or the like. The second force sensor 23-2 detects a force and moment acting on the second end effector END2. The second force sensor 23-2 outputs information representing the detected force and moment (hereinafter, referred to as "force sensor information") to the control apparatus 30 by communication.

The force sensor information detected by one or both of the first force sensor 23-1 and the second force sensor 23-2 is used for the control of the robot 20 by the control apparatus 30 based on the force sensor information. The control based on the force sensor information refers to compliance control of e.g. impedance control or the like. Note that, as below, the first force sensor 23-1 and the second force sensor 23-2 will be collectively referred to as "force sensors 23" unless distinction is necessary. Further, values showing the magnitude of the force and the magnitude of the moment contained in the force sensor information are examples of output values of the force sensor.

The robot 20 further includes the built-in control apparatus 30, and controlled by the built-in control apparatus 30. Note that the robot 20 may have a configuration controlled by the control apparatus 30 provided outside in place of the configuration with the built-in control apparatus 30.

In the embodiment, each functional part of the robot 20 acquires control signals from the control apparatus 30 built in the robot 20, and performs operations based on the acquired control signals.

The control apparatus 30 allows the robot 20 to operate by transmitting the control signals to the robot 20. The control apparatus 30 determines the grasping position of the packing material P based on the housing status of the objects O packed in the packing material P based on the stereo-captured images (i.e., the first captured image and the second captured image) acquired from the third imaging part 21 and the fourth imaging part 22. The control apparatus 30 allows the robot 20 to grasp the grasping position of the packing material P based on the housing status of the objects O packed in the packing material P. After the robot 20 grasps the grasping position of the packing material P based on the housing status of the objects O packed in the packing material P, the control apparatus 30 allows the robot 20 to perform the above described predetermined work.

Next, referring to FIG. 2, a hardware configuration of the control apparatus 30 will be explained.

FIG. 2 shows an example of the hardware configuration of the control apparatus 30. The control apparatus 30 includes e.g. a CPU (Central Processing Unit) 31, a memory unit 32, an input receiving unit 33, a communication unit 34, and a display unit 35, and performs communication with the robot 20 via the communication unit 34. These component elements are communicably connected to one another via a bus Bus. The CPU 31 executes various programs stored in the memory unit 32.

The memory unit 32 includes e.g. an HDD (Hard Disk Drive), an SSD (Solid State Drive), an EEPROM (Electrically Erasable Programmable Read-Only Memory), a ROM (Read-Only Memory), a RAM (Random Access Memory), or the like, and stores various kinds of information, images, programs, etc. to be processed by the control apparatus 30. Note that the memory unit 32 may be an external memory device connected by a digital input/output port such as a USB in place of one built in the control apparatus 30.

The input receiving unit 33 is e.g. a teaching pendant including a keyboard, a mouse, and a touch pad or another input device. Note that the input receiving unit 33 may be integrally formed with the display unit as a touch panel.

The communication unit 34 includes e.g. a digital input/output port such as a USB, an Ethernet (registered trademark) port, or the like.

The display unit 35 is e.g. a liquid crystal display panel or an organic EL (ElectroLuminescence) display panel.

Next, referring to FIG. 26, a functional configuration of the control apparatus 30 will be explained.

Figure 26:
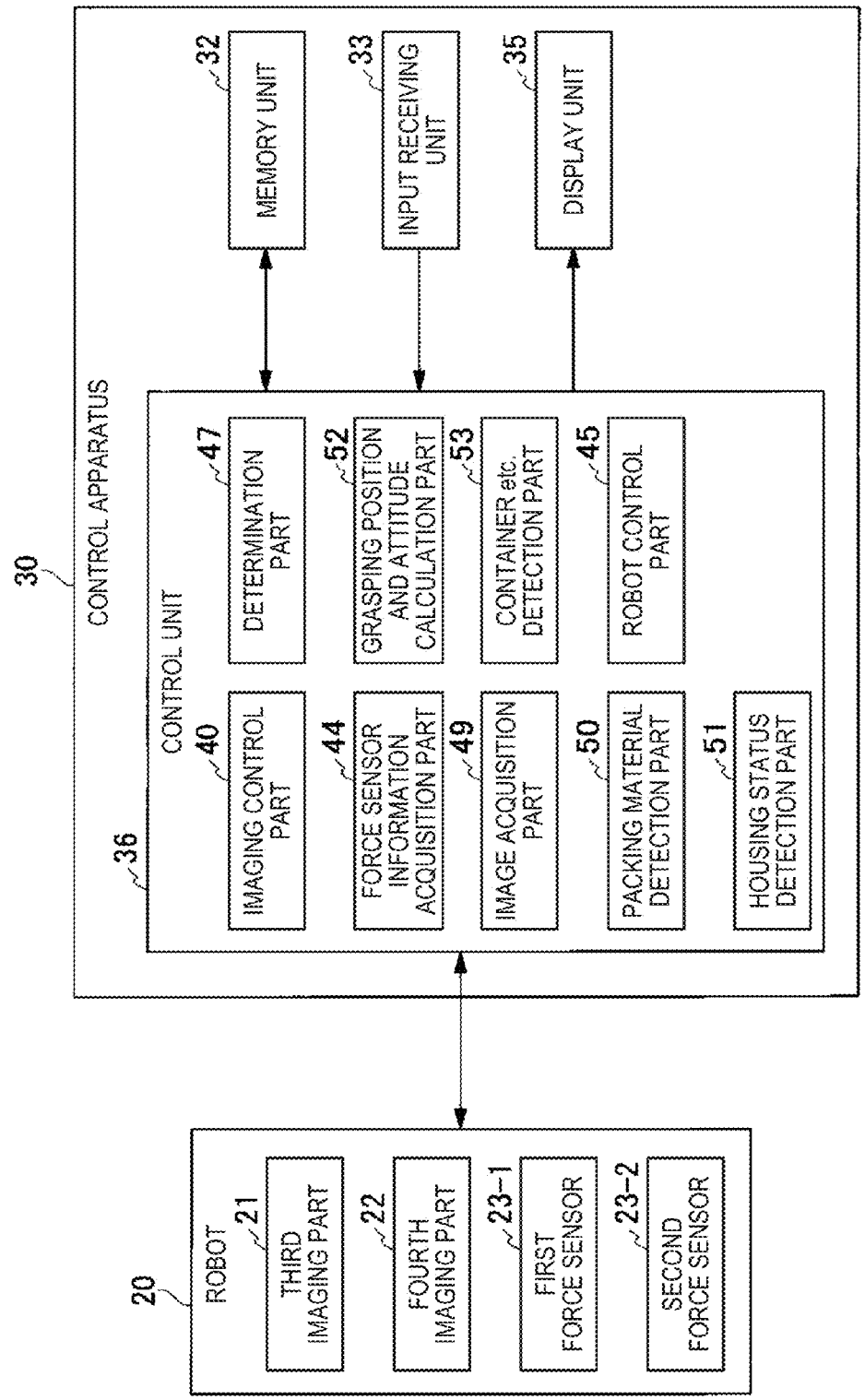
FIG. 26 shows an example of a functional configuration of a control apparatus.

FIG. 26 shows an example of the functional configuration of the control apparatus 30. The control apparatus 30 includes the memory unit 32, the input receiving unit 33, the display unit 35, and a control unit 36. Part or all of the functional parts of the control unit 36 are realized by e.g. the CPU 31 executing various programs stored in the memory unit 32. Further, part or all of these functional parts may be hardware functional parts including LSI (Large Scale Integration) and ASIC (Application Specific Integrated Circuit).

The control unit 36 controls the whole of the control apparatus 30. The control unit 36 includes an imaging control part 40, a force sensor information acquisition part 44, an image acquisition part 49, a packing material detection part 50, a housing status detection part 51, a determination part 47, a grasping position and attitude calculation part 52, a container etc. detection part 53, and a robot control part (packing apparatus control part) 45.

The imaging control part 40 allows the third imaging part 21 and the fourth imaging part 22 to stereo-image the imaging range. More specifically, the imaging control part 40 allows the third imaging part 21 to capture the first captured image and allows the fourth imaging part 22 to capture the second captured image.

The force sensor information acquisition part 44 acquires the force sensor information detected by the force sensor 23.

The image acquisition part 49 acquires the stereo-captured images from the third imaging part 21 and the fourth imaging part 22. More specifically, the image acquisition part 49 acquires the first captured image captured by the third imaging part 21 from the third imaging part 21 and acquires the second captured image captured by the fourth imaging part 22 from the fourth imaging part 22.

The packing material detection part 50 detects e.g. a contour of the packing material P based on the stereo-captured images acquired by the image acquisition part 49. In the example, the detection of the contour of the packing material P refers to detection of the shape of the contour and detection of positions of respective points forming the contour of the packing material P (e.g. pixels, an aggregation of pixels, or the like) on the stereo-captured images. As below, for convenience of explanation, the shape of the contour of the packing material P and the positions of the respective points forming the contour of the packing material P will be collectively referred to as "counter of packing material P".

Further, the packing material detection part 50 detects a position and an attitude of the packing material P in an imaging part coordinate system based on the stereo-captured images acquired by the image acquisition part 49. In the example, the imaging part coordinate system is a common coordinate system to the third imaging part 21 and the fourth imaging part 22. Note that the position and the attitude on the first captured image and the position and the attitude on the imaging part coordinate system are associated with each other by calibration in advance. Further, the position and the attitude on the second captured image and the position and the attitude in the imaging part coordinate system are associated with each other by calibration in advance. Note that, in the example, the detection of the position and the attitude of the packing material P refers to detection of the position and the attitude of the center of gravity of the packing material P, however, may refer to detection of a position and an attitude of another part associated with the packing material P.

Furthermore, the packing material detection part 50 detects e.g. the contours of the objects O packed inside of the packing material P based on the stereo-captured images acquired by the image acquisition part 49. In the example, the detection of the contours of the objects O refers to detection of the shapes of the contours and detection of positions of respective points forming the contours of the objects O (e.g. pixels, an aggregation of pixels, or the like) on the stereo-captured images. As below, for convenience of explanation, the shapes of the contours of the objects O and the positions of the respective points forming the contours of the objects O will be collectively referred to as "counters of objects O".

The housing status detection part 51 detects the housing status of the objects O packed in the packing material P based on the contour of the packing material P detected by the packing material detection part 50 and the contours of the objects O detected by the packing material detection part 50. In the example, the housing status refers to one of a status in which the objects O are uniformly housed (distributed) inside of the packing material P and a status in which the objects O are housed (distributed) with a bias toward a certain partial region inside of the packing material P. Specifically, the housing status detection part 51 detects the housing status by determining whether or not the respective contours of the objects O detected within the contour of the packing material P are uniformly distributed within the contour of the packing material P.

As below, for convenience of explanation, the status in which the objects O are uniformly housed (distributed) inside of the packing material P will be referred to as "first housing status". For example, the housing status of the objects O packed in the packing material P shown in FIG. 25 is the first housing status because the objects O are substantially uniformly housed inside of the packing material P. Further, as below, the status in which the objects O are housed (distributed) with a bias toward a certain region inside of the packing material P will be referred to as "second housing status". That is, the housing status detection part 51 detects whether the housing status of the objects O packed in the packing material P is the first housing status or the second housing status based on the contour of the packing material P detected by the packing material detection part 50 and the contours of the objects O detected by the packing material detection part 50.

The determination part 47 determines whether or not the contours of the objects O packed in the packing material P have been detected by the packing material detection part 50. Further, the determination part 47 determines whether or not the housing status detected by the housing status detection part 51 is the second housing status.

The grasping position and attitude calculation part 52 calculates (determines) a position and an attitude of a portion of the packing material P grasped by the first end effector END1 based on the housing status detected by the housing status detection part 51. The calculated position and attitude of the portion of the packing material P grasped by the first end effector END1 are a position and an attitude in the robot coordinate system. Further, the grasping position and attitude calculation part 52 calculates (determines) a position and an attitude of a portion of the packing material P grasped by the second end effector END2 based on the housing status detected by the housing status detection part 51. The calculated position and attitude of the portion of the packing material P grasped by the second end effector END2 are a position and an attitude in the robot coordinate system.

Note that the grasping position and attitude calculation part 52 may have e.g. a configuration of determining the position and the attitude of the portion of the packing material P by another method such as a configuration of selecting (determining) the position and the attitude of the portion of the packing material P in response to the housing status detected by the housing status detection part 51 from a table in which the position and the attitude of the portion of the packing material P grasped by the first end effector END1 and the housing status are associated. Further, the grasping position and attitude calculation part 52 may have e.g. a configuration of determining the position and the attitude of the portion of the packing material P by another method such as a configuration of selecting (determining) the position and the attitude of the portion of the packing material P in response to the housing status detected by the housing status detection part 51 from a table in which the position and the attitude of the portion of the packing material P grasped by the second end effector END2 and the housing status are associated.

The container etc. detection part 53 detects a position and an attitude of the supply container T1 based on the stereo-captured images acquired by the image acquisition part 49. In the example, the position and the attitude of the supply container T1 refer to a position and an attitude of a predetermined portion of the supply container T1 in the robot coordinate system. The predetermined portion of the supply container T1 is e.g. the center of the bottom surface of the supply container T1, however, may be another portion instead.

Further, the container etc. detection part 53 detects a position and an attitude of the removal container T2 based on the stereo-captured images acquired by the image acquisition part 49. In the example, the position and the attitude of the removal container T2 refer to a position and an attitude of a predetermined portion of the removal container T2 in the robot coordinate system. The predetermined portion of the removal container T2 is e.g. the center of the bottom surface of the removal container T2, however, may be another portion instead.

Furthermore, the container etc. detection part 53 detects a position and an attitude of the blade B of the cutter C based on the stereo-captured images acquired by the image acquisition part 49. In the example, the position and the attitude of the blade B of the cutter C refer to a position and an attitude of a predetermined portion of the blade B of the cutter C in the robot coordinate system. The predetermined portion of the blade B of the cutter C is e.g. a portion to which the packing material P is pressed when the packing material P is cut with the blade B, however, may be another portion instead.

The robot control part 45 generates a control signal for allowing the robot 20 to operate based on the various positions and attitudes calculated by the grasping position and attitude calculation part 52, and outputs the generated control signal to the robot 20. Further, the robot control part 45 generates a control signal for allowing the robot 20 to perform predetermined work and outputs the generated control signal to the robot 20.

Next, referring to FIG. 27, processing of allowing the robot 20 to unpack the packing material P and perform predetermined work by the control unit 36 will be explained.

Figure 27:
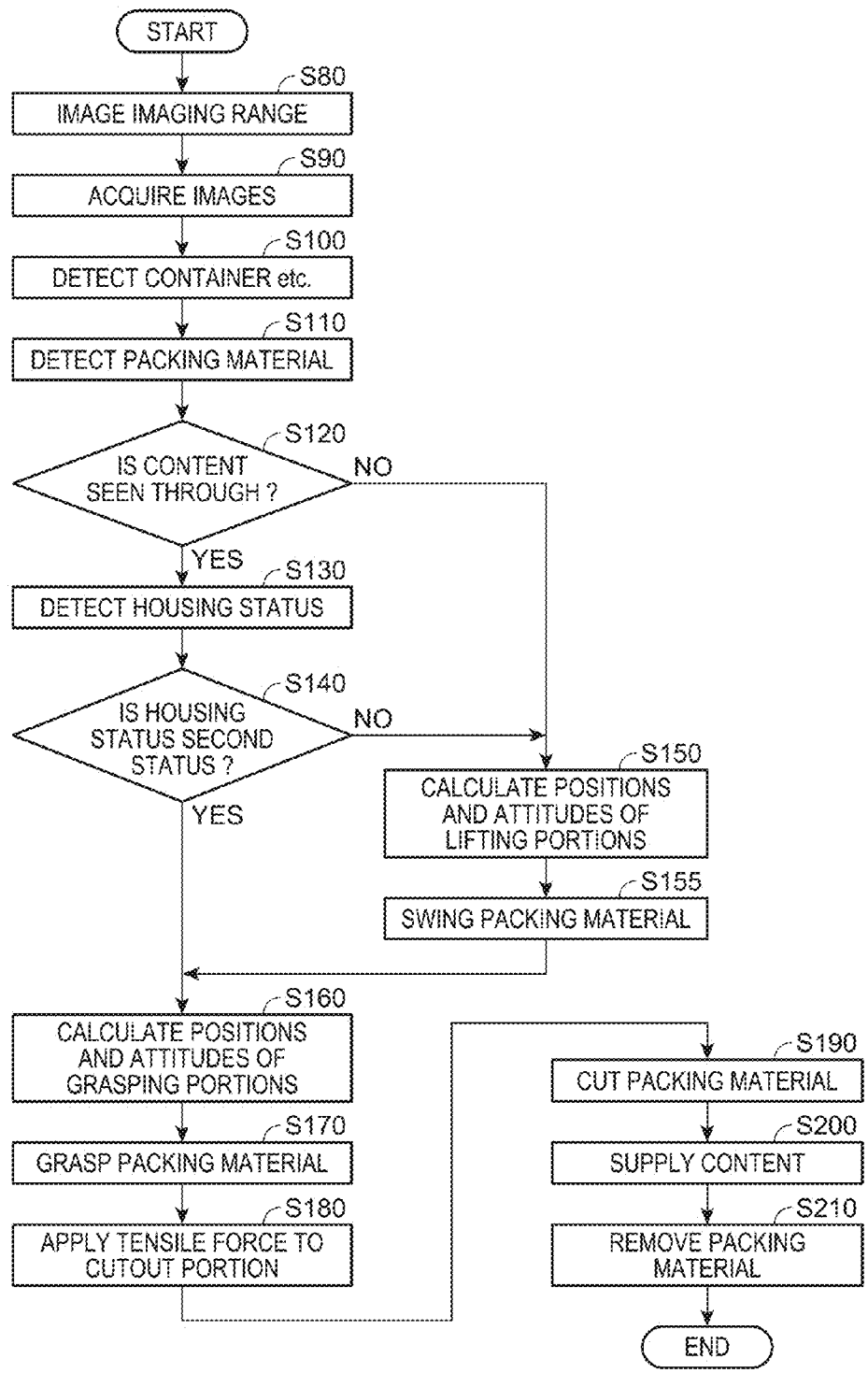
FIG. 27 is a flowchart showing an example of a flow of processing of allowing the robot to unpack the packing material and perform predetermined work by a control unit.

FIG. 27 is a flowchart showing an example of a flow of processing of allowing the robot 20 to unpack the packing material P and perform predetermined work by the control unit 36. Note that, as below, the case where the packing material P with the objects O packed therein has been already placed within the imaging range will be explained.

First, the imaging control part 40 allows the third imaging part 21 and the fourth imaging part 22 to stereo-image the imaging range (step S80). Then, the image acquisition part acquires the stereo-captured images (i.e., the first captured image and the second captured image) from the third imaging part 21 and the fourth imaging part 22 (step S90).

Then, the container etc. detection part 53 detects the position and the attitude of the supply container T1 based on the stereo-captured images acquired by the image acquisition part 49 at step S90. Further, the container etc. detection part 53 detects the position and the attitude of the removal container T2 based on the stereo-captured images acquired by the image acquisition part 49 at step S90. Furthermore, the container etc. detection part 53 detects the position and the attitude of the blade B of the cutter C based on the stereo-captured images acquired by the image acquisition part 49 at step S90 (step S100).

Note that the container etc. detection part 53 detects the position and the attitude of the supply container T1 by reading a reference image of the supply container T1 stored in the memory unit 32 in advance and performing pattern matching using the read reference image or the like. Further, the container etc. detection part 53 detects the position and the attitude of the removal container T2 by reading a reference image of the removal container T2 stored in the memory unit 32 in advance and performing pattern matching using the read reference image or the like. Furthermore, the container etc. detection part 53 detects the position and the attitude of the blade B of the cutter C by reading a reference image of the blade B of the cutter C stored in the memory unit 32 in advance and performing pattern matching using the read reference image or the like.

Then, the packing material detection part 50 detects the contour of the packing material P based on the stereo-captured images acquired by the image acquisition part 49 at step S90. Further, the packing material detection part 50 detects the position and the attitude of the packing material P based on the stereo-captured images acquired by the image acquisition part 49 at step S90. Furthermore, the packing material detection part 50 detects the contours of the respective objects O packed in the packing material P based on the stereo-captured images acquired by the image acquisition part 49 at step S90 (step S110).

Note that the packing material detection part 50 detects the contour of the packing material P and further detects the position and the attitude of the packing material P by reading a reference image of the packing material P stored in the memory unit 32 in advance and performing pattern matching using the read reference image or the like. Further, the packing material detection part 50 detects the contours of the objects O by reading a reference image of the objects O stored in the memory unit 32 in advance and performing pattern matching using the read reference image or the like.

Then, the determination part 47 determines whether or not the contours of the respective objects O packed in the packing material P have been detected by the packing material detection part 50 at step S110 (step S120). The determination at step S120 is, in other words, a determination as to whether or not the objects O packed in the packing material P can be visually recognized from outside of the packing material P.

If the determination that the contours of the respective objects O packed in the packing material P have not been detected by the packing material detection part 50 (i.e., detection of the housing status is impossible) is made (step S120—No), the grasping position and attitude calculation part 52 calculates a position and an attitude of a first lifting portion and a position and an attitude of a second lifting portion based on the position and the attitude of the packing material P detected by the packing material detection part 50 at step S110 (step S150). The first lifting portion is a portion in which the packing material P is grasped by the first end effector END1 when the robot 20 lifts and swings the packing material P in the processing at step S155. The second lifting portion is a portion in which the packing material P is grasped by the second end effector END2 when the robot 20 lifts and swings the packing material P in the processing at step S155.

Here, the processing of calculating the position and the attitude of the first lifting portion and the position and the attitude of the second lifting portion by the grasping position and attitude calculation part 52 is explained. The grasping position and attitude calculation part 52 reads information representing relative position and attitude from the center of gravity of the packing material P to the first lifting portion stored in the memory unit 32 in advance. Then, the grasping position and attitude calculation part 52 calculates the position and the attitude of the first lifting portion in the robot coordinate system based on the read information and the position and the attitude of the packing material P detected by the packing material detection part 50. Note that the position and the attitude in the imaging part coordinate system and the position and the attitude in the robot coordinate system are associated with each other by calibration in advance.

Further, the grasping position and attitude calculation part 52 reads information representing relative position and attitude from the center of gravity of the packing material P to the second lifting portion stored in the memory unit 32 in advance. Then, the grasping position and attitude calculation part 52 calculates the position and the attitude of the second lifting portion in the robot coordinate system based on the read information and the position and the attitude of the packing material P detected by the packing material detection part 50.

After the position and the attitude of the first lifting portion in the robot coordinate system and the position and the attitude of the second lifting portion in the robot coordinate system are calculated by the grasping position and attitude calculation part 52 at step S150, the robot control part 45 allows the first end effector END1 to grasp the first lifting portion based on the position and the attitude of the first lifting portion, and allows the second end effector END2 to grasp the second lifting portion based on the position and the attitude of the second lifting portion.

Then, the robot control part 45 reads information representing a first predetermined height stored in the memory unit 32 in advance, and lifts the first lifting portion to the first predetermined height by the first end effector END1 based on the read information representing the first predetermined height. Further, the robot control part 45 reads information representing a second predetermined height stored in the memory unit 32 in advance, and lifts the second lifting portion to the second predetermined height by the second end effector END2 based on the read information representing the second predetermined height. The first predetermined height and the second predetermined height may be the same height or different heights. As below, in the example, the case where the first predetermined height and the second predetermined height are the same height will be explained. The first predetermined height and the second predetermined height are e.g. heights at which, when the packing material P is lifted, the packing material P is separated from the workbench TB, or may be other heights.

The robot control part 45 allows the first end effector END1 to lift the first lifting portion to the first predetermined height and allows the second end effector END2 to lift the second lifting portion to the second predetermined height, and then, allows one or both of the first end effector END1 and the second end effector END2 to swing (vibrate) the packing material P (step S155).

More specifically, for example, the robot control part 45 allows the robot 20 to swing (i.e., vibrate) the packing material P by allowing one or both of the first end effector END1 and the second end effector END2 to perform reciprocating motion along predetermined directions at a predetermined number of reciprocations until a predetermined time lapses. Note that the predetermined time is e.g. five seconds, or may be another length of time. Further, the predetermined directions are directions in parallel to the x-coordinate axis or the y-coordinate axis in the robot coordinate system, or may be other directions. Furthermore, the predetermined number of reciprocations is e.g. 2 [l/s], or may be another number of reciprocations. For example, the z-coordinate axis in the robot coordinate system is set in a direction perpendicular to the ground, and the x-coordinate axis and the y-coordinate axis in the robot coordinate system are respectively set to directions orthogonal to the z-coordinate axis. The x-coordinate axis and the y-coordinate axis are orthogonal to each other.

The robot 20 is allowed to swing the packing material P at step S155, and thereby, the housing status of the objects O packed in the packing material P turns to the second housing status because the objects O move downward by gravity inside of the packing material P. That is, even in the case where the detection of the housing status of the objects O packed in the packing material P is impossible (the housing status is unknown), the robot control part 45 may change (adjust) the housing status to the second housing status by allowing the robot 20 to swing the packing material P. Note that the robot control part 45 may change the housing status to the second housing status by allowing the first end effector END1 to lift the first lifting portion to the first predetermined height and allowing the second end effector END2 to lift the second lifting portion to the second predetermined height without swinging the packing material P. However, the robot control part may change (adjust) the housing status to the second housing status more reliably by allowing the robot 20 to swing the packing material P.

After changing the housing status of the objects O packed in the packing material P to the second housing status at step S155, the robot control part 45 reads a predetermined placement position stored in the memory unit 32 in advance and places the packing material P in the read placement position. Then, the grasping position and attitude calculation part 52 executes processing at step S160, which will be described later. Note that, at step S155, the robot control part 45 acquires the force sensor information detected by the respective first force sensor 23-1 and second force sensor 23-2 from the force sensor information acquisition part 44, and allows the first end effector END1 and the second end effector END2 to operate under the control based on the acquired force sensor information. Thereby, the robot control part 45 may suppress unintended unpacking of the packing material P by one or both of the first end effector END1 and the second end effector END2.

On the other hand, if the determination that the contours of the respective objects O packed in the packing material P have been detected by the packing material detection part 50 is made (step S120—Yes), the housing status detection part 51 detects whether the housing status of the objects O packed in the packing material P is the first housing status or the second housing status based on the contour of the packing material P detected by the packing material detection part 50 at step S110 and the contours of the objects O detected by the packing material detection part 50 (step S130).

Then, the determination part 47 determines whether or not the housing status detected by the housing status detection part 51 at step S130 is the second housing status (step S140). If the housing status detected by the housing status detection part 51 is not the second housing status (step S140—No), the grasping position and attitude calculation part 52 transitions to step S150, and calculates the position and the attitude of the first lifting portion in the robot coordinate system and the position and the attitude of the second lifting portion in the robot coordinate system. On the other hand, if the housing status detected by the housing status detection part 51 is the second housing status (step S140—Yes), the grasping position and attitude calculation part 52 calculates a position and an attitude of a first grasping portion and a position and an attitude of a second grasping portion (step S160). The first grasping portion is a portion in which the packing material P is grasped by the first end effector END1 in processing at step S170. The second grasping portion is a portion in which the packing material P is grasped by the second end effector END2 in the processing at step S170.

Figure 28:
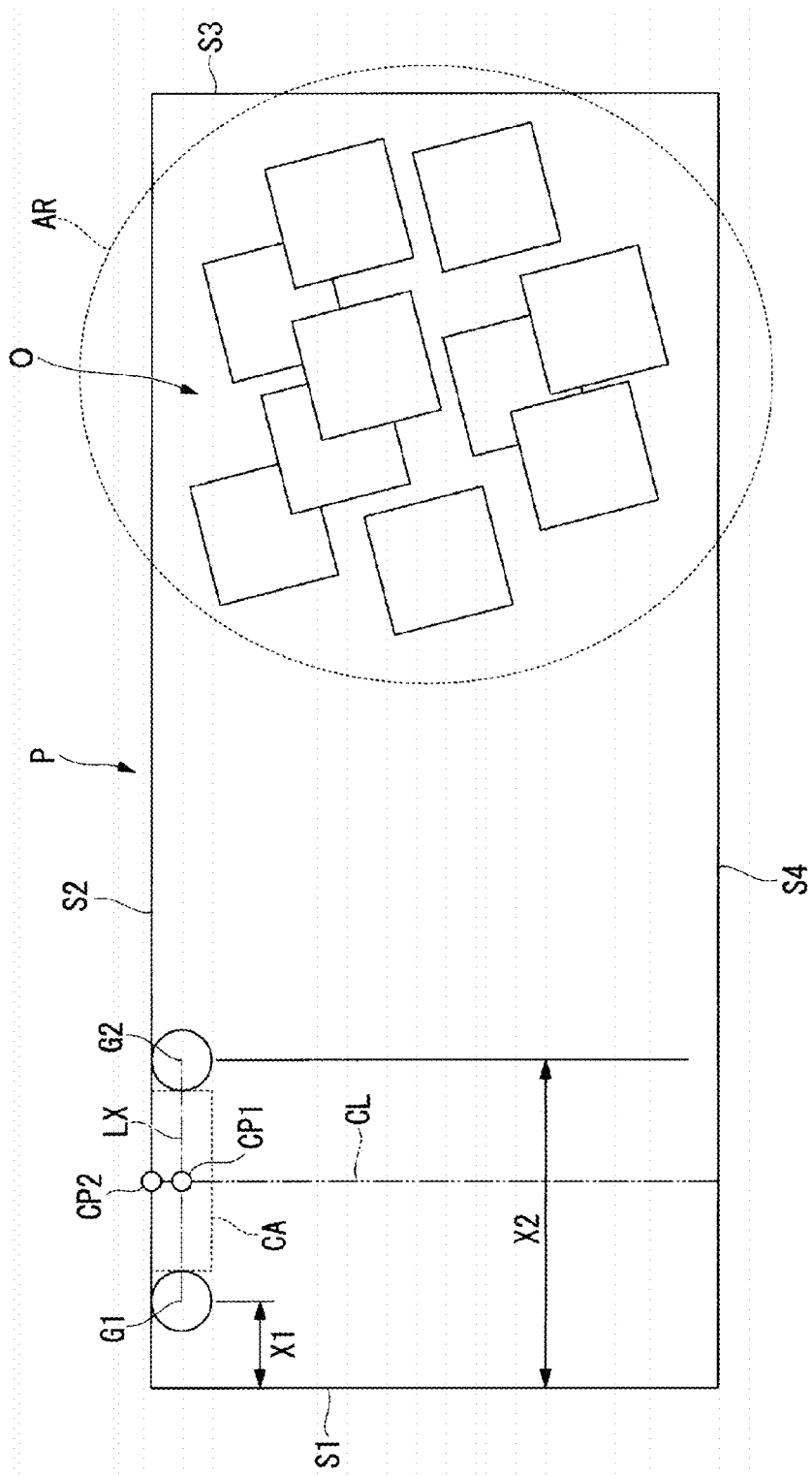
FIG. 28 shows an example of the packing material in which a housing status of objects is a second housing status.

Here, referring to FIG. 28, the processing of calculating the position and the attitude of the first grasping portion and the position and the attitude of the second grasping portion by the grasping position and attitude calculation part 52 is explained.

FIG. 28 shows an example of the packing material P in which the housing status of objects O is the second housing status. In FIG. 28, for convenience of explanation, four sides of the packing material P will be respectively referred to as "side S1 to side S4". Further, in FIG. 28, the objects O collect in a region surrounded by a dotted line AR on the side S3 side inside of the packing material P and realize the second housing status.

The grasping position and attitude calculation part 52 detects e.g. a position and an attitude of a midpoint of the side S1 on the opposite side to the side S3 side on which the objects O collect based on the contour of the packing material P detected by the packing material detection part 50 at step S110 and the contours of the objects O detected by the packing material detection part 50. Then, the grasping position and attitude calculation part 52 reads information representing the position and the attitude of the first grasping portion and information representing the position and the attitude of the second grasping portion stored in the memory unit 32 in advance.

The position and the attitude of the first grasping portion stored in the memory unit 32 are information representing relative position and attitude from the midpoint of the side S1 to the first grasping portion. Further, the position and the attitude of the second grasping portion stored in the memory unit 32 are information representing relative position and attitude from the midpoint of the side S1 to the second grasping portion. The grasping position and attitude calculation part 52 calculates the position and the attitude of the first grasping portion in the robot coordinate system and the position and the attitude of the second grasping portion in the robot coordinate system based on the detected position and attitude of the midpoint of the side S1, the position and the attitude of the first grasping portion read from the memory unit 32, and the position and the attitude of the second grasping portion read from the memory unit 32.

In FIG. 28, the first grasping portion is shown by a circle G1 and the second grasping portion is shown by a circle G2. As below, for convenience of explanation, the circle G1 will be referred to as "first grasping portion G1" and the circle G2 will be referred to as "second grasping portion G2". The first grasping portion G1 and the second grasping portion G2 are e.g. positions that satisfy the following three conditions. Note that the first grasping portion G1 and the second grasping portion G2 may be positions that satisfy other conditions in place of the positions satisfying the following three conditions.

Condition 1) The first grasping portion G1 and the second grasping portion G2 are located on the side S2 or the side S4 orthogonal to the side S1.

Condition 2) A part in which cutting is started when the packing material P is unpacked passes through a midpoint of a straight line connecting the first grasping portion G1 and the second grasping portion G2 and is located on a straight line orthogonal to the straight line.

Condition 3) The first grasping portion G1 is located in a position separated at a first predetermined distance from the side S1 and the second grasping portion G2 is located in a position separated at a second predetermined distance from the side S1.

In FIG. 28, the first predetermined distance is shown by a distance X1 and the second predetermined distance is shown by a distance X2. Further, in FIG. 28, the part cut by the blade B of the cutter C when the packing material P is unpacked is shown by a line CL. In FIG. 28, the straight line connecting the first grasping portion G1 and the second grasping portion G2 is shown by a dashed-dotted line LX and the midpoint of the dashed-dotted line LX is shown by a circle CP1. Further, in FIG. 28, the part in which cutting is started when the packing material P is unpacked is shown by a circle CP2. Note that, in FIG. 28, the case where distance X1<distance X2 is shown, however, distance X1>distance X2 may be set. As below, for convenience of explanation, the first predetermined distance will be referred to as "first predetermined distance X1" and the second predetermined distance will be referred to as "second predetermined distance X2". As shown in FIG. 28, the first grasping portion G1 is separated from the side S1 by the first predetermined distance X1 and located on the side S2. Further, the second grasping portion G2 is separated from the side S1 by the second predetermined distance X2 and located on the side S2. Furthermore, the circle CP2 is located on the dashed-dotted line LX. Accordingly, the first grasping portion G1 and the second grasping portion G2 satisfy the above described conditions 1 to 3.

Then, the robot 20 grasps the first grasping portion G1 of the packing material P by the first end effector END1. Further, the robot 20 grasps the second grasping portion G2 of the packing material P by the second end effector END2. The robot 20 moves the packing material P in a direction along the side S2 from the side S4 to the side S2 and presses the part of the packing material P shown by the circle CP2 to the blade B of the cutter C, and thereby, cuts the packing material P along the line CL and unpacks the packing material P. Note that, as below, for convenience of explanation, a portion between the first grasping portion G1 and the second grasping portion G2 surrounded by a dotted line CA shown in FIG. 28 will be referred to as "cutout portion CA" to which the blade B of the cutter C is first pressed. The cutout portion CA is an example of a position where a packing material is tensed.

After the position and the attitude of the first grasping portion G1 in the robot coordinate system and the position and the attitude of the second grasping portion G2 in the robot coordinate system are calculated in the processing at step S160, the robot control part 45 allows the first end effector END1 to grasp the first grasping portion G1 and allows the second end effector END2 to grasp the second grasping portion G2 based on the calculated position and attitude of the first grasping portion G1 and the calculated position and attitude of the second grasping portion G2 (step S170). Note that, at step S170, the robot control part 45 acquires the force sensor information detected by the force sensors 23 from the force sensor information acquisition part 44, and operates the first end effector END1 and the second end effector END2 under the control based on the acquired force sensor information.

Then, the robot control part 45 applies forces in directions in which the first end effector END1 and the second end effector END2 separate from each other, and thereby, applies a tensile force to the above described cutout portion CA and holds the cutout portion CA without slack (step S180). Thereby, the robot control part 45 may suppress an event occurring due to an insufficient tensile force applied to the packing material P (or the cutout portion CA of the packing material P), e.g., a failure of cutting of the packing material P due to entanglement of the packing material P with the blade. Further, at step S180, the robot control part 45 acquires the force sensor information detected by the force sensors 23 from the force sensor information acquisition part 44, and holds the cutout portion CA without slack under the control based on the acquired force sensor information. Thereby, the robot control part 45 may suppress an excessive force applied to the cutout portion CA by the first end effector END1 and the second end effector END2 to tear the packing material P.

Then, the robot control part 45 moves the packing material P by the first end effector END1 and the second end effector END2 and presses the cutout portion CA to the blade B of the cutter C, and thereby, cuts and unpacks the packing material P along the line CL (step S190). Note that, at step S190, the robot control part 45 reads information representing the position of the part shown by the circle CP2 stored in the memory unit 32 in advance, and calculates the position of the part shown by the circle CP2 in FIG. 28 in the robot coordinate system based on the read information and the position and the attitude of the packing material P detected by the packing material detection part 50 at step S110. The information representing the position of the part shown by the circle CP2 refers to information representing a relative position from the center of gravity of the packing material P to the part shown by the circle CP. The robot control part 45 performs the processing at step S190 based on the calculated position of the circle CP in the robot coordinate system and the position and the attitude of the blade B of the cutter C detected by the container etc. detection part 53 at step S100.

Note that, if the robot control part 45 fails to cut the packing material P at step S190, the part may change the grasping position grasped by one or both of the first end effector END1 and the second end effector END2 to another grasping position and perform the processing from step S180 to step S190 again. For example, if the part fails to cut the packing material P at step S190 because the first end effector END1 grasps the first grasping portion G1, the user may change the grasping position grasped by the first end effector END1 from the first grasping portion G1 to another grasping position using the robot control part 45.

Or, if the part fails to cut the packing material P at step S190 because the second end effector END2 grasps the second grasping portion G2, the user may change the grasping position grasped by the second end effector END2 from the second grasping portion G2 to another grasping position using the robot control part 45. Or, if whether the grasping position of the first end effector END1 or the second end effector END2 causes the failure of cutting is unclear, the user may change the grasping positions grasped by the respective first end effector END1 and second end effector END2 to other grasping positions using the robot control part 45.

Accordingly, even when the robot control part 45 fails to cut the packing material P, the part may continue the work without interruption.

Then, the robot control part 45 moves the packing material P to a supply position while grasping the second grasping position G2 by the second end effector END2 (step S200). In the example, the supply position is a position separated at a third predetermined distance immediately above the center of the bottom surface of the supply container T1. Note that the supply position may be e.g., if the supply container T1 has an insertion hole, a position indicating the insertion hole or another position in which the objects O can be supplied to the supply container T1. At step S200, the robot control part 45 reads supply position information stored in the memory unit 32 in advance. The supply position information is information representing a relative position from a predetermined portion of the supply container T1 (in the example, the center of the bottom surface of the supply container T1) to the supply position.

The robot control part 45 moves the packing material P to the supply position by the second end effector END2 based on the position and the attitude of the predetermine portion of the supply container T1 detected by the container etc. detection part 53 and the supply position information read from the memory unit 32. Note that the robot control part 45 may support the bottom of the packing material P by the first end effector END1 when moving the packing material P to the supply position by the second end effector END2. The bottom of the packing material P refers to e.g. a portion immediately below the center of gravity of a portion hanging downward in the vertical direction due to the weight of the objects O of the packing material P lifted by the second end effector END2, or may be another portion.

Then, after moving the packing material P to the supply position by the second end effector END2, the robot control part 45 lifts the packing material P by the first end effector END1 and the second end effector END2 so that the cut part of the packing material P may be downward, and supplies (takes out, mounts) the objects O housed inside of the packing material P to the supply container T1. Note that "downward" refers to a direction along the z-coordinate axis in the above described robot coordinate system from the third imaging part 21 and the fourth imaging part 22 toward the ground.

Then, the robot control part 45 removes the packing material P grasped by the first end effector END1 and the second end effector END2 to the removal container T2 (step S210). At step S210, the robot control part 45 reads removal position information stored in the memory unit 32 in advance. The removal position information is information representing a relative position from a predetermined portion of the removal container T2 (in the example, the center of the bottom surface of the removal container T2) to a removal position.

The robot control part 45 calculates the removal position in the robot coordinate system based on the position and the attitude of the predetermine portion of the removal container T2 detected by the container etc. detection part 53 and the removal position information read from the memory unit 32. The robot control part 45 moves the packing material P grasped by the first end effector END1 to the removal position based on the calculated removal position, and removes (mounts) the packing material P to the removal container T2 by opening the hook portion of the first end effector END1 in the removal position. Further, the robot control part 45 moves the packing material P grasped by the second end effector END2 to the removal position based on the calculated removal position, and removes (mounts) the packing material P to the removal container T2 by opening the hook portion of the second end effector END2 in the removal position.

As described above, the control unit 36 performs the processing from step S80 to step S210, and thereby, allows the robot 20 to grasp the position of the packing material P determined based on the housing status of the objects O housed inside of the packing material P (in the example, the first grasping position and the second grasping position) and allows the robot 20 to perform predetermined work. Thereby, the control unit 36 may allow the robot 20 to grasp the position in response to the housing status of the objects packed in the packing material and perform work.

Note that, in the respective processing of the flowchart shown in FIG. 27, the roles of the first arm and the second arm may be reversed. Further, one or both of the first end effector END1 and the second end effector END2 may include a suction part that suctions the objects by drawing air in place of the hook portion. When the first end effector END1 includes the suction part, the first end effector END1 suctions the first grasping portion G1 in place of the configuration of grasping the first grasping portion G1. Further, when the second end effector END2 includes the suction part, the second end effector END2 suctions the second grasping portion G2 in place of the configuration of grasping the second grasping portion G2.

The control unit 36 may have a configuration of detecting the housing status by allowing the robot 20 to trace the surface of the packing material P using one or both of the first end effector END1 and the second end effector END2 by the robot control part 45 in place of the configuration of detecting the housing status of the objects O packed in the packing material P based on the contour of the packing material P detected by the packing material detection part 50 and the contours of the objects O detected by the packing material detection part 50. In this case, the robot control part 45 detects the height of the upper surface of the workbench TB by tracing the upper surface of the workbench TB with nothing mounted thereon using one or both of the first end effector END1 and the second end effector END2.

Then, the robot control part 45 traces the surface of the packing material P with the objects O packed therein, for example, from the side S1 to the side S3 of the packing material P using one or both of the first end effector END1 and the second end effector END2. In this regard, the robot control part 45 traces the surface of the packing material P not to move the packing material P under the control based on the force sensor information acquired from the force sensor information acquisition part 44. Further, in this regard, the control unit 36 detects the height of the surface of the packing material P at each time when one or both of the first end effector END1 and the second end effector END2 move on the surface of the packing material P by a predetermined distance. The control unit 36 stores correspondence information in which the detected height and the information representing the position on the surface of the packing material P are associated. The control unit 36 specifies a distribution of the positions on the surface of the packing material P in which the height of the surface detected on the surface of the packing material P is equal to or more than a predetermined value based on the stored correspondence information, and detects the housing status of the objects O packed inside of the packing material P based on the specified distribution.

As described above, the robot 20 in the embodiment grasps the packing material P based on the housing status of the objects O packed in the packing material P. More specifically, the robot 20 grasps the position of the packing material P determined based on the housing status of the objects O packed in the packing material P (in the example, the position of the first grasping portion G1 and the position of the second grasping portion G2). Thereby, the robot 20 may grasp the position in response to the housing status of the objects packed in the packing material and perform work.

Further, the robot 20 grasps the packing material P, and then, cuts the packing material P. The robot 20 may take the objects O from the inside of the packing material P to the outside of the packing material P.

When cutting the packing material P, the robot 20 cuts the position in which the packing material P is tensed (in the example, the cutout portion CA). Thereby, the robot 20 may suppress a failure of cutting of the packing material P due to an event caused by an insufficient tensile force applied to the packing material P.

After cutting the packing material P, the robot 20 takes out the objects O from the packing material P and mounts the packing material P on a predetermined location. Thereby, the robot 20 may repeatedly unpack the packing material P and supply the objects O without interference with the unpacked packing material P.

Further, the robot 20 grasps the packing material P, moves the packing material P, and thereby, changes the position relationship between the objects O and the packing material P. Thereby, the robot 20 may grasp the position in response to the housing status adjusted by moving the packing material P and perform work.

If it is impossible to detect the housing status, the robot 20 changes the position relationship between the objects O and the packing material P by moving the packing material P. Thereby, even when the housing status of the objects O packed in the packing material P is unknown, the robot 20 may grasp the position in response to the housing status adjusted by moving the packing material P and perform work.

The robot 20 grasps the first grasping portion of the packing material P by the first end effector END1 and grasps the second grasping portion of the packing material P by the second end effector END2 based on the housing status of the objects O packed in the packing material P. Thereby, the robot 20 may grasp the first grasping portion in response to the housing status of the objects O packed in the packing material P by the first end effector END1 and grasp the second grasping portion in response to the housing status by the second end effector END2 and perform work.

Further, the robot 20 determines the housing status of the objects O packed in the packing material P based on positions of at least two or more objects O inside of the packing material P. Thereby, the robot 20 may grasp the position in response to the housing status determined based on the positions of the two or more objects O and perform work.

The robot 20 detects positions of at least two or more objects O inside of the packing material P based on captured images captured by the third imaging part 21 and the fourth imaging part 22. Thereby, the robot 20 may grasp the position in response to the housing status determined based on the positions of the two or more objects O detected based on the captured images and perform work.

Further, the robot 20 moves one or both of the first end effector END1 and the second end effector END2 to trace the surface of the packing material P, and determines the housing status based on changes in height of the surface of the packing material P. Thereby, the robot 20 may grasp the position in response to the housing status determined based on the changes in height of the surface of the packing material P and perform work.

Furthermore, if the robot 20 grasps the packing material P by the first end effector END1 and fails to cut the packing material P, the robot changes the grasping position of the packing material P by the first end effector END1. Thereby, the robot 20 may continue work without interruption even when the first end effector END1 grasps the position not suitable for cutting of the packing material P and the cutting of the packing material P fails, for example.

If the robot 20 grasps the packing material P by the second end effector END2 and fails to cut the packing material P, the robot changes the grasping position of the packing material P by the second end effector END2. Thereby, the robot 20 may continue work without interruption even when one or both of the first end effector END1 and the second end effector END2 grasp the position not suitable for cutting of the packing material P and the cutting of the packing material P fails, for example.

Further, the robot 20 grasps the packing material P based on the force sensor information acquired from the force sensors 23. Thereby, the robot 20 may suppress unintended unpacking of the packing material P by applying an excessive force to the packing material P when grasping the packing material P.

As described above, the embodiments of the invention are described in detail with reference to the drawings, however, the specific configurations are not limited to the embodiments and may be changed, replaced, or eliminated without departing from the scope of the invention.

In addition, the program for realization of functions of arbitrary configuration parts in the above described apparatuses (e.g. the control apparatus 30 of the packing system 1, the control apparatus 30 of the robot 20) may be recorded in a computer-readable recording medium and read and executed by a computer system. Note that "computer system" here includes an OS (Operating System) and hardware such as peripheral equipment. Further, "computer-readable recording medium" refers to a portable medium such as a flexible disk, a magneto-optical disk, a ROM, or a CD (Compact Disk)-ROM, a storage device such as a hard disk built in the computer system. Furthermore, "computer-readable recording medium" includes one that holds the program for a fixed time such as a volatile memory (RAM) within a computer system as a server or client when the program is transmitted via a network of the Internet or the like or a communication line of a telephone line or the like.

The program may be transmitted from the computer system in which the program is stored in the storage device or the like to another computer system via a transmission medium or transmission wave in the transmission medium. Here, "transmission medium" for transmission of the program refers to a medium having a function of transmitting information such as a network of the Internet or the like (communication network) or a communication line of a telephone line or the like.

Further, the program may realize part of the above described functions. Furthermore, the program may realize the above described functions by a combination with the program already recorded in the computer system, and may be the so-called differential file (differential program).

The entire disclosure of Japanese Patent Application No. 2015-059564, filed Mar. 23, 2015 and No. 2015-058339, filed Mar. 20, 2015 are expressly incorporated by reference herein.

What is claimed is:

1. A robot comprising:
   a base
   a first arm provided on the base, the first arm having a first end effector;
   a second arm provided on the base, the second arm having a second end effector and a force sensor;
   an imaging device configured to capture an image of an inside of a package, the package having first and second walls opposite to each other, the package being configured to contain an object in the inside of the package;
   a memory storing computer-readable instructions; and
   a processor executing the computer-readable instructions to control the robot to:
      cause the imaging device to capture the image including the package and the object;
      perform a first operation to position the first and second end effectors between the object and the second wall;

after the first operation, perform a second operation to contact the object with the first end effector by moving the first end effector toward the first wall;

after the second operation, perform a third operation to move the object toward the first wall with the first end effector so that the object will be placed in contact with the first wall; and after the third operation commences, perform a fourth operation to move the second wall into contact with the second end effector and when the force sensor detects a force applied to the second end effector that is equal to or larger than a threshold value, the processor causes the first end effector to stop moving.

2. The robot according to claim 1,
wherein the processor is further configured to:

cause the first end effector to selectively apply a force to the first wall so that the package moves; and cause the second end effector to selectively contact the second wall so as to adjust a location of the package in response to an output signal from the force sensor and place the object in the package.

\* \* \* \* \*